United States Patent
Linke et al.

(10) Patent No.: US 10,821,646 B2
(45) Date of Patent: Nov. 3, 2020

(54) METHOD AND DEVICE FOR PRODUCING CONTAINERS FILLED WITH A LIQUID FILLING MATERIAL AND CLOSED WITH A CLOSURE CAP

(71) Applicant: KHS CORPOPLAST GmbH, Hamburg (DE)

(72) Inventors: Michael Linke, Hamburg (DE); Rolf Baumgarte, Ahrensburg (DE); Michael Litzenberg, Geesthacht (DE); Thomas Van Hamme, Kisdorf (DE)

(73) Assignee: KHS Corpoplast GmbH, Hamburg (DE)

( * ) Notice: Subject to any disclaimer, the term of this patent is extended or adjusted under 35 U.S.C. 154(b) by 0 days.

(21) Appl. No.: 16/301,344

(22) PCT Filed: Apr. 6, 2018

(86) PCT No.: PCT/EP2018/058846
§ 371 (c)(1),
(2) Date: Nov. 13, 2018

(87) PCT Pub. No.: WO2018/185277
PCT Pub. Date: Oct. 11, 2018

(65) Prior Publication Data
US 2019/0358885 A1    Nov. 28, 2019

(30) Foreign Application Priority Data
Apr. 7, 2017    (DE) .................. 10 2017 003 410

(51) Int. Cl.
*B29C 49/06*    (2006.01)
*B29C 49/46*    (2006.01)
(Continued)

(52) U.S. Cl.
CPC ............. *B29C 49/06* (2013.01); *B29C 49/46* (2013.01); *B29C 2049/1228* (2013.01);
(Continued)

(58) Field of Classification Search
CPC ......... B29C 49/06; B29C 49/12; B29C 49/36; B29C 49/46; B29C 49/42; B29C 49/4273;
(Continued)

(56) References Cited

U.S. PATENT DOCUMENTS 3,969,455 A    7/1976  Moller
4,076,071 A    2/1978  Rosenkranz et al.
(Continued)

FOREIGN PATENT DOCUMENTS

DE    1271618 B    6/1968
DE    2352926 A1   4/1975
(Continued)

*Primary Examiner* — Joseph S Del Sole
*Assistant Examiner* — Jamel M Nelson
(74) *Attorney, Agent, or Firm* — Rankin, Hill & Clark LLP

(57) ABSTRACT

The invention relates to a method and to a device for producing containers (11) filled with a liquid filling material (21, 21.1) from preforms (2) made of a thermoplastic material, wherein the preform (2) is thermally conditioned before its transformation, and subsequently, during a forming and filling phase, in a mold (37) of a forming and filling station (10), it is transformed into the container (11) by means of the filling material (21, 21.1) as pressure medium, wherein the filling material (21, 21.1) is introduced from a forming and filling head (28) into the preform, wherein the forming and filling head (28) is moved from a rest position, which enables a supplying and insertion of a preform into the mold (37) of the forming and filling station (10), into a sealing position with respect the preform (2), wherein, during the transformation into the container (11), the pre-
(Continued)

form (2) is preferably guided at least temporarily by a stretching rod (17) and stretched in axial direction, wherein, after the completion of the forming and filling phase, the container (11) is closed with a closure cap (15) before the container (11) is removed from the forming and filling station (10), wherein the closure cap (15) is supplied from a cap supplying device (50) into the area of the forming and filling station (10), and characterized in that, after the completion of the forming and filling phase, the forming and filling head (28) is moved from the sealing position into a position spaced apart from the container (11), then the closure cap (15) is supplied into the area between container (11) and forming and filling head (28), and then the closure cap (15) is pressed by the forming and filling head (28) in a longitudinal direction (32) of the container onto the container (11).

16 Claims, 15 Drawing Sheets

(51) Int. Cl.
*B29C 49/12* (2006.01)
*B29L 31/00* (2006.01)
*B65B 3/02* (2006.01)

(52) U.S. Cl.
CPC .......... *B29C 2049/4664* (2013.01); *B29L 2031/7158* (2013.01); *B65B 3/022* (2013.01)

(58) Field of Classification Search
CPC .... B29C 2049/4664; B29C 2049/1228; B65B 3/022; B65B 7/16; B65B 7/28; B65B 7/2835; B29L 2031/7158; B26K 2067/003

See application file for complete search history.

(56) References Cited

U.S. PATENT DOCUMENTS

| | | | |
|---|---|---|---|
| 5,346,386 A | 9/1994 | Albrecht et al. | |
| 5,648,026 A | 7/1997 | Weiss | |
| 5,692,628 A | 12/1997 | Montgomery et al. | |
| 7,914,726 B2 | 3/2011 | Andison et al. | |
| 2012/0266567 A1* | 10/2012 | Haesendonckx | B29C 49/12 53/456 |
| 2013/0307197 A1* | 11/2013 | Haesendonckx | B29D 22/003 264/524 |
| 2015/0143778 A1 | 5/2015 | Humele et al. | |

FOREIGN PATENT DOCUMENTS

| | | | | |
|---|---|---|---|---|
| DE | 2538714 A1 | | 3/1977 | |
| DE | 4212583 A1 | | 10/1993 | |
| DE | 4340291 A1 | | 6/1995 | |
| DE | 19705315 A1 | | 8/1998 | |
| DE | 102010007541 A1 | | 6/2011 | |
| DE | 102011057112 A1 | | 7/2013 | |
| EP | 2949585 A1 | | 12/2015 | |
| GB | 1044419 A | | 9/1966 | |
| JP | 2016032921 A | * | 3/2016 | ............ B29C 49/28 |
| WO | 2012104019 A1 | | 8/2012 | |

\* cited by examiner

METHOD AND DEVICE FOR PRODUCING CONTAINERS FILLED WITH A LIQUID FILLING MATERIAL AND CLOSED WITH A CLOSURE CAP

The invention relates to a method according to the preamble of Claim 1 and to a device according to the preamble of Claim 8.

The production of containers by blow molding of preforms from a thermoplastic material, for example, from preforms made of PET (polyethylene terephthalate), is known, wherein the preforms are supplied to different processing stations within a blow molding machine (DE 43 40 291 A1). Typically, a blow molding machine comprises a heating device for temperature conditioning or thermal conditioning of the preforms, and a blowing device with at least one blowing station in the area of which the in each case previously temperature-adjusted preform is expanded to form a container. The expansion occurs by means of a pressurized gas (pressurized air) as pressure medium which is introduced with a forming pressure into the preform to be expanded. The procedural sequence of such an expansion of the preform is explained in DE 43 40 291 A1. The basic design of a blowing station is described in DE 42 12 583 A1. Possibilities of temperature conditioning of the preforms are explained in DE 23 52 926 A1. Temperature conditioning or thermal conditioning is understood to mean that the preform is heated to a temperature suitable for blow molding and a temperature profile is optionally imprinted on the preform. Blow molding of containers from preforms with the additional use of a stretching rod is also known.

According to a typical processing method, the containers produced by blow molding are supplied to a subsequent filling device and filled there with the product or filling material provided. Thus, a separate blow molding machine and a separate filling machine are used. Here, it is known to combine the separate blow molding machine and the separate filling machine to form a machine block, i.e., to form an integral molding-filling device, wherein moreover the blow molding and the filling occur on separate machine components and temporally successively.

Moreover, it has already been proposed to produce containers, including in particular in the form of bottles, from thermally conditioned or temperature-conditioned preforms and to simultaneously fill them with a liquid filling material which is supplied as a hydraulic pressure medium for expanding the preform or for shaping the container with a forming and filling pressure, so that, simultaneously with the filling, the respective preform is transformed into the container. Such methods in which a simultaneous forming and filling of the respective container occurs can also be referred to as hydraulic transforming methods or as hydraulic container forming. Here too it is known to support this transformation with the use of a stretching rod.

In the forming of a container from preforms by means of the filling material itself, i.e., using the filling material as hydraulic pressure medium, only one machine is then necessary for the forming and filling of the container, although said machine is of increased complexity. U.S. Pat. No. 7,914,726 B2 shows an example of such a machine. DE 2010007541 A1 shows another example.

Moreover, it is known that filled containers are closed in a subsequent work step by closing devices. For this purpose, after the completion of the filling, the containers are transferred, for example, by the filling device, to a transport device and supplied to a closing device. Here too, it is known to form a block consisting of the closing device and upstream machines.

Machines are also known in which containers are subjected to several of the above-mentioned processes in the same machine. Thus, for example, DE 10 2011 057112 A1 shows a machine with a continuously revolving work wheel in the production operation, on which circumferentially distributed processing stations are arranged for the processing of finished formed containers. The work wheel here carries three types of processing stations, namely several filling stations, several labeling stations, and several closing stations. These stations are arranged alternatingly, that is to say each third station is designed as a filling, a labeling or a closing device. The processing of the finished formed container occurs with all three types of processing stations in a total of three work wheel revolutions, wherein, between the respective revolutions, the container is relocated between the different stations, for example, by intermittent removal from a processing station of one type and renewed, relocated insertion onto the work wheel in a processing station of another type. After each container has been processed in three revolutions with all three types of stations, the container definitively leaves the work wheel. Indeed, with this construction solution only one work wheel is necessary. However, to achieve high throughput rates, this wheel has to have very large dimensions in order to allow for arranging a sufficient number of processing stations, and, in order to achieve a high production rate, the work wheel has to rotate relatively rapidly, since the revolution time determines the processing time per processing step. Thus, overall, this also results in considerable handling difficulties during the handling of the containers, since the containers have to be removed repeatedly from the work wheel and transferred back to the work wheel.

A problem in the hydraulic container forming consists in that it is necessary to avoid soiling of the respective forming and filling station or of the mold forming this station, which is implemented similarly to a blow mold of a blow molding machine for producing containers from thermally conditioned preforms by blowing with a pressurized gas. Particularly in the case of complete or partial carbonation of the filling material, there is, in particular, a risk of soiling the respective forming and filling station due to filling material losses. Such filling material losses can occur already when the inner pressure of the container drops, i.e., when the pressure of the container is reduced from the very high forming and filling pressure to ambient pressure. Such filling material losses are caused in particular by massive foam formation during the pressure release, so that the simultaneous forming and filling of containers using preforms and using filling material as pressure medium (hydraulic forming technique), in particular for CO2-containing products, represents a particular challenge.

Filling material losses can also occur in that filled containers have to be removed from the forming and filling station, which results here in direction changes during the handling of the container. It is precisely in the case of filling stations arranged on work wheels which rotate continuously in the production operation that resulting removal-caused variable accelerations are applied to the containers and their content. In the case of the desired high production numbers, these work wheels rotate rapidly resulting in correspondingly high accelerations of container and container content. In the process, liquid leakage can occur. The leaking liquid can in the process soil, for example, the mold for the container forming and as a result quality defects of the containers produced and rejects can occur. The liquid leakage also leads to hygienic problems which should be avoided.

These last-mentioned filling material losses can be avoided effectively in that the containers are closed immediately after their filling, but while they are still on the work wheel for the filling. This is known, for example, from DE 10 2010 007541 A1 and from WO 2012/104019 A1. In the two documents, filled containers are provided with a closure while still within the forming and filling station in which a preform is transformed into container by the introduction of the filling material under pressure. For this purpose, closure caps are supplied by a cap supplying device to the forming and filling stations and put onto the filled containers, after the forming and filling head, referred to as connection element in the documents mentioned, has been lifted from the container mouth after the completion of the forming process, but before the filled container has been removed from the forming and filling station. For this purpose, a closing device is provided, which is either arranged coaxially and rotatably relative to the forming and filling head, or the forming and filling head is held together with the closing device by a tool carrier and positioned alternatively in a work arrangement or in a rest arrangement. In the two variants shown therein, the closing device screws a screw closure cap onto the filled container.

The aim of the invention is to disclose a method which further improves and further simplifies the closing of the fully formed and filled containers while they are still within the forming and filling station. Another aim of the invention is to disclose a device which further improves and further simplifies the closing of the fully formed and filled containers while they are still within the forming and filling station and which is designed for carrying out the method according to the invention. Finally, an additional aim is to disclose a suitable closure system consisting of a container and a closure cap and to disclose closure caps suitable for the closure system.

To achieve this aim, a method is designed for producing containers filled with a liquid filling material according to Claim 1. A device for producing containers filled with a liquid filling material is the subject matter of Claim 8.

In the method according to the invention and likewise in the device according to the invention, the attachment of the closure to the container occurs with the aid of the forming and filling head. In the process, a closing cap is pressed onto the mouth area of the formed and filled container. As a rule, the container and the closure cap each have mutually interacting contours in order to secure the closure cap on the container. These contours can be, for example, threadings or beads, grooves, collars or the like extending in circumferential direction. According to the invention, it is provided that the closure cap closes the container at least temporarily after the pressing on. In the context of the invention, this is understood to mean in particular that the closure cap is pressed onto the container so that it cannot become detached from the container unintentionally during the usual further handling. As a rule, this is achieved in that, after the pressing on, the contours provided on container and/or closure cap are at least partially in mutual engagement or were brought in engagement by the pressing on. For example, the contours slide with radial offset past one another during the pressing on. Thus, the pressing on according to the invention differs in particular from a tightening that is otherwise conventionally used for screw closures in that the thread contours are always moved with radial overlap and not with radial offset with respect to one another.

According to the invention, it is also provided that, after completion of the forming and filling phase, that is to say when a completely transformed and filled container is present, the forming and filling head is first moved from the sealing position into a position spaced apart from the container. The sealing position is the position assumed during the forming and filling phase, and it is characterized in that the forming and filling head is in sealing contact on the preform or on the mold, in order to be able to feed the filling material under the required filling pressure into the preform. In the position spaced apart from the container, a closure cap can then be supplied into the area between container and forming and filling head, and subsequently the closure cap can then be pressed by the forming and filling head in a longitudinal direction of the container onto the container. This pressing on of the closure cap can occur, for example, up to a first sealing position, which merely ensures that no filling material losses occur during the handling of the container during the removal from the work wheel. It could be provided that the closure cap is brought into the final closure position in a later closure step. However, it is also possible that the screw closure is already brought into its final closed position in the forming and filling station, for example, in that it is pressed completely onto the container until the final closure position is reached. In comparison to forming and filling heads known to date, a change in control technology has to be made in particular, so that the forming and filling head can assume the different positions in the described manner and perform the described movements or performs them in a controlled manner.

Advantageously, it is proposed that the forming and filling head also carries out the receiving of a closure cap. For this purpose, on its side turned toward the mold, it has receiving means for a closure cap. By carrying out a receiving movement, the forming and filling head receives a supplied closure cap. This receiving movement can be, for example, a movement toward the closure cap. After the reception of the closure cap has occurred, the pressing on of the cap onto the container can then occur subsequently. To carry out this movement, the control of the forming and filling head movements has to be carried out accordingly.

The receiving means can be designed in a simple and thus preferred manner as a recess formed on the forming and filling head. This recess is dimensioned here in such a manner that a closure cap is taken up in a manner secured against tilting. This tilting prevention is intended to prevent the cap margin facing the container from colliding with the mouth edge of the container during the subsequent pressing onto the container. A slight tilting can thus be allowed, that is to say the closure cap can be received with some play in the recess.

The dimensioning of the recess can also be designed without play and thereby the closure cap can be received in a clamping manner in the recess. Here, in the dimensioning, it should be ensured that the clamping force is sufficiently large in order to ensure a reliable holding of the closure cap, on the one hand. However, the clamping force should also be sufficiently small so that it is possible to raise the forming and filling head again after the pressing of the closure cap onto the container without the closure cap being pulled off the container again. Here, the manufacturing tolerances of the closure caps, which are disclosed by the cap manufacturers in the cap specifications, should be taken into consideration.

The dimensioning of the recess is preferably also selected so that the closure cap received therein is only partially received therein, that is to say, for example, in axial direction, substantially only the closed cover area of the closure cap or the area which is later not pressed onto the container, for example, the thread-free area near the cap cover, while, for example, the cap area provided with an inner thread is not received in the recess. By these measures, it is possible to achieve that the closure cap is capable of undergoing a radial broadening during the pressing onto the container. For example, only at most 40%, preferably at most 25%, of the closure cap in its axial extension can be received in the recess. As a result, the cap area pressed onto the container, for example the threaded area of the closure cap, remains outside of the recess and it can broaden outward during the pressing onto the container. It can also be provided that the closure caps are enclosed only partially in radial direction by the recess.

The supplying of the closure caps can occur in principle using any handling means which are also known in the handling of containers or preforms, for example, grippers. However, the supplying of the closure caps preferably occurs by means of a positionable supply rail, on which the closure caps are supplied in a sliding manner to the forming and filling station. In this case, positionable is understood to mean that the rail is arranged in a rest position during the forming and filling process. For the supplying of a closure cap to a forming and filling station, the rail is then arranged so that a closure cap can be led along the rail into the area between the container mouth and the forming and filling head. Here, a loading finger is preferably provided, which moves the closure cap on the supply rail to the desired position. In the case of a corresponding shaping of the end area of the loading finger, said loading finger can additionally surround the closure cap in radial direction of the cap and thereby protect it from slipping. The supply rail can also have guide means in order to protect the closure cap against lateral slipping.

In the context of the invention, various caps or closure systems can be used. For example, it is conceivable to use closure systems wherein the closure cap surrounds a circumferential bead on the container, allowing opening by levering or tearing open the closure cap.

However, in the context of the invention, the closure cap is preferably a screw closure cap. This makes possible a reclosing of the container after a first-time opening. In the context of the invention, a screw closure cap is understood to mean in particular a cap which is released and opened by turning or screwing.

Here, for example, in each case a threading is provided in the closure cap and on the container. According to the invention, it has been recognized that a screw closure cap can be pressed onto the mouth area without damaging the threads provided on the cap inner side or on the container outer side. Here, at least some of the threads provided can be brought in engagement with one another, in particular without turning movement, by pressing the closure cap onto the container. The forming and filling head can carry out this pressing on by means of a corresponding pressing on movement.

As explained at the beginning, the closure cap can be pressed according to the invention into a final closing position onto the container. However, under some circumstances, this represents an extensive loading of the thread on the container and in the closure cap. Here, it must also be taken into consideration that the cap is easier to broaden in the area of its open end than in the cap area located closer to the closed end. It can also be advantageous to press the closure cap only partially onto the container. In this context, according to the invention, the possibility exists of first pressing the closure cap onto the container over a first distance, for example, until the cap threading engages with the container threading, and then to further screw on the cap. This screwing on can also occur outside of the forming and filling station. However in order to perform this still in the forming and filling station, it turns out to be advantageous to subdivide the forming and filling head into a rotatable head section which, for example, has the recess for the closure cap, and a torque-proof head section. The rotatable head section is arranged rotatably on the torque-proof head section. For the rotation of the rotatable head section with respect to the torque-proof head section, a drive device is provided. This drive device can be implemented in particular as a toothed wheel drive, in particular as mutually meshing toothed wheels with a toothed wheel which is driven by a driving means, wherein the rotatable head section has a toothed wheel firmly connected thereto, which is in meshing engagement with a toothed wheel which can be driven by the driving means. By rotation of the rotatable head section, the closure cap held by this section, after the first pressing on of the cap, can be screwed in a thread-sparing manner onto the container. An additional advantage of the above-explained final rotation of the closure cap is that thereby a desirable position in circumferential direction between the container and the closure cap or between the thread partners formed thereon can be achieved. But this is advantageous for an optimal sealing effect. When the closure cap is pressed onto the container, on the other hand, there is at first a somewhat relative position in circumferential direction with respect to one another. To that extent the final performance of the rotation movement has the additional advantage that the sealing is improved, since an orientation of the threading or of the thread partners occurs in the process.

An exceedingly compact construction is promoted in that the containers, in the described methods and devices, are formed, filled and closed on a rotating work wheel. In the production operation, this work wheel revolves continuously.

The above-explained inventive methods and devices can be implemented in the same way with and without the use of a stretching rod. However, a stretching rod is preferably provided.

A closure system suitable for use in the context of the invention, consisting of a container and of a screw closure cap, is designed as in the prior art, for example, in that the closure cap can be screwed on/or off the container. For this purpose, between the container and the closure cap, in a connection area, a screw connection can be formed, in that corresponding thread flights and/or thread grooves can be formed there. Here, it is also possible to provide that one of the partners of the screw connection is at first designed to be thread-free in the area of the screw connection. The other connection partner, on the other hand, in this connection area, has a threading with sharp-edged thread flights formed as cutting means. When the closure cap as explained above is pressed onto the container, then the thread-free formation of the participating connection areas turns out to be advantageous, since the closure cap can be pressed on with reduced resistance. When the closure cap is unscrewed, then the thread-cutting effect of the sharp-edged thread flights becomes apparent, namely in that in the process thread grooves are then cut in the previously thread-free area.

Two possibilities exist for this. On the one hand, before the closing of the container with the closure cap, the connection area of the container arranged on the cap side can be formed to be thread-free. Then, the connection area of the closure cap arranged on the container side has a threading with sharp-edged thread flights formed as cutting means. The expressions arranged on the cap side and arranged on the container side are understood to refer to the side facing the cap or the container. On the other hand, before the closing of the container with the closure cap, the connection area of the container arranged on the cap side can be formed with a thread with sharp-edged thread flights formed as cutting means. Then, the connection area of the closure cap arranged on the container side is formed to be thread-free. In both cases, the sharp-edged thread flights formed as cutting means are preferably made out of a material with a higher hardness, in particular a higher Shore hardness, than the thread-free connection area, in particular with a higher Shore hardness than the thermoplastic plastics used in the blow molding production of containers from preforms, in particular higher than PET. This advantageously improves the cutting action. The aim of the above features is that, when the closure cap is unscrewed from the container, the sharp-edged thread flights formed as cutting means cut thread grooves into the thread-free connection area.

A closure cap for use in a closure system as described above correspondingly has, on its closure cap inner side, sharp-edged thread flights formed as cutting means, preferably made out of a material with a higher hardness, in particular with a higher Shore hardness, than the thermoplastic plastics used in the blow molding production of containers from preforms, in particular higher than PET.

For the pushing or pressing of these caps onto a container, it is advantageous if the thread flights are designed in segments, where, preferably, a 360° circumferential thread flight on this circumferential section is subdivided into more than 4, preferably into more than 6, more preferably into more than 8 segments. This facilitates the radial broadening of the cap in the course of the pressing onto the container.

An advantage of the above-explained closure cap and of the above-explained closure system is that, due to the features according to the invention, it is immaterial which position in circumferential direction the two partners assume with respect to one another during the pressing on. This is different from when the two partners during the pressing on already have the mutually interacting threads or thread grooves. In the pressed-on position, as a result of the pretensioning force of the thread flights during the unscrewing, an axial force in loosening direction will build up, in which direction the closure cap can be unscrewed. In a similar way, this is known from rolling ring drives in which an axial force is exerted on a smooth round rod.

Developments, advantages and application possibilities of the invention also result from the following description of embodiment examples and from the figures. Here, all the described and/or pictorially represented features individually or in any combination are in principle subject matter of the invention, independently of their summarization in the claims or references to the claims. The content of the claims is also made a part of the description.

Below, the invention is explained in greater detail in reference to the figures in embodiment examples. In the figures:

FIG. 1 shows a diagrammatic representation of a basic design of a forming and filling machine for carrying out the hydraulic container forming using a filling material according to the prior art, FIG. 2 shows a diagrammatic longitudinal section through a preform with partially inserted stretching rod and with a venting device according to the prior art, FIG. 3 shows a diagrammatic longitudinal section through a formed container with partially introduced stretching rod according to the prior art, FIG. 4 shows a diagrammatic representation of a combined forming, filling and closure station according to the prior art, FIG. 5 shows another embodiment of the combined forming, filling and closure station according to the prior art, FIG. 6 shows a diagrammatic detail view in cross section through a forming and filling station with a forming and filling head with a first embodiment example of a closure device and with a preform in a first process phase of an inventive forming and filling as well as closing process;

Figure 1:
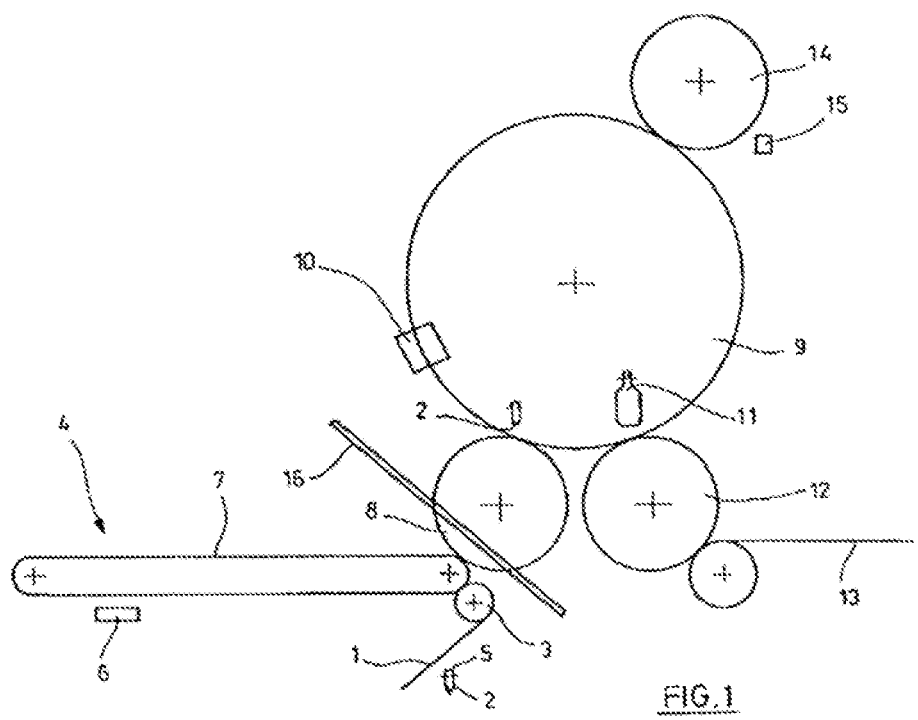

The design of a combined forming and filling machine, which is known in principle from the prior art, is represented in FIG. 1. The representation shows the preferred design of such a machine as a rotating construction with a rotating work wheel (9). By a supply device (1), diagrammatically represented preforms (2) which are also referred to as blanks are continuously supplied to a heating device (4) using a transfer wheel (3). In the area of the heating device (4), in which the preforms (2) are transported along a heating section and thermally conditioned in the process, the preforms (2) can be transported, depending on the application, for example, with their mouth sections (5) in vertical direction upward or in vertical direction downward. The heating device (4) is equipped, for example, with heating elements (6) which are arranged along a transport device (7) for the formation of the heating section. As transport device (7) it is possible to use, for example, a revolving chain with transport spikes for holding the preforms. As heating elements (6), IR emitters or light-emitting diodes or NIR emitters are suitable, for example. Since such heating devices are known in a wide variety of types in the prior art, and since the construction details of the heating device are not essential for the present invention, a detailed description can be omitted, and reference can be made to the prior art, in particular to the prior art on heating devices of blow molding machines and of stretch blowing machines.

After sufficient temperature conditioning (also referred to as thermal conditioning), the preforms (2) are transferred from a transfer wheel (8) to a rotatably arranged work wheel (9), i.e., a work wheel which can be driven revolving around a vertical machine axis, or to forming and filling stations (10) which are provided on the work wheel (9) distributed over the circumference. The work wheel (9) is equipped with a plurality of such forming and filling stations (10), in the area of which both a transformation of the preforms (2) into the diagrammatically represented containers (11) and also a filling of the containers (11) with the provided filling material occur. The forming of each container (11) here occurs simultaneously with the filling, wherein the filling material is used as pressure medium during the forming.

After the forming and filling, the containers (11) are removed by a removal wheel (12) from the work wheel (9), transported further and supplied to an output section (13). The work wheel (9) revolves continuously in the production operation with a desired speed of revolution. During one revolution, the following occur: the insertion of a preform (2) in a forming and filling station (10), the expansion of the preform (2) to form a container (11) including filling with a filling material and optionally including stretching, if a stretching rod is provided, and the removal of the container (11) from the forming and filling station (10).

According to the embodiment in FIG. 1, it is moreover provided to supply the work wheel (9) with diagrammatically represented closure caps (15) via an input device (14). Thereby, it is already possible to also carry out a closing of the container (11) on the work wheel (9) and to handle fully formed, filled and closed containers (11) using the removal device (12). Details on the closure caps (15) and on the closing of the containers (11) result from the examples discussed below.

As material for the preforms (1), different thermoplastic materials can be used. As examples, polyethylene terephthalate (PET), polyethylene (PE), polyethylene naphthalate (PEN) or polypropylene (PP) are mentioned. The dimensioning and the weight of the preforms (2) can be adjusted to the size, the weight and/or the shape of the container (11) to be produced.

Typically, in the area of the heating device (4), a plurality of electrical and electronic components are arranged. In addition, the heating elements (6) are provided with moisture-sensitive reflectors. Since, in the area of the work wheel (9), using the liquid filling material, a filling and forming of the containers (11) occurs, in order to prevent electrical problems, it should be ensured that unintended introduction of moisture into the area of the heating device (4) is avoided. This can occur, for example, by a partitioning device (16) which offers at least splash protection. In addition, it is also possible to appropriately temperature condition transport elements used in the area of the transfer wheel (8) for the preforms (2) or to expose them to pressurized gas pulses so that adhering moisture cannot reach the area of the heating device (4).

A handling of the preforms (2) and/or of the containers (11) using grippers and/or clamping or plug-in spikes applied to the mouth section (5) at lease in some sections from inside or from outside. Such handling means are also sufficiently known from the prior art.

Figure 2:
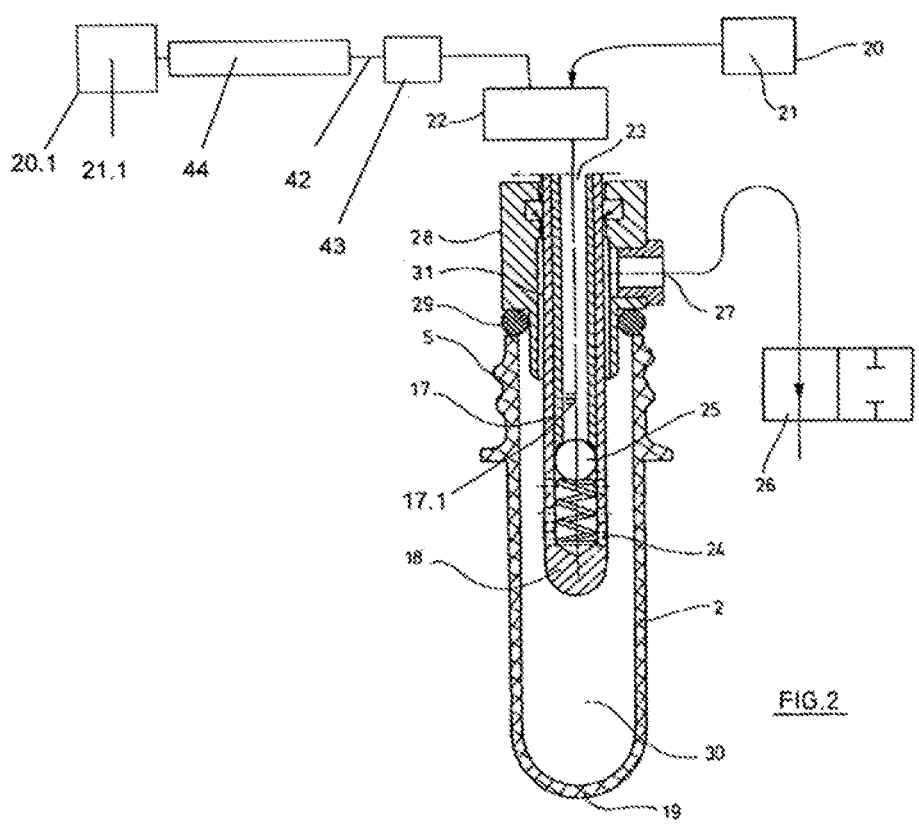

FIG. 2 shows a longitudinal section through a preform (2), in which a stretching rod (17) is inserted. The stretching rod (17) is used for the at least temporary guiding of the preform (1) during its transformation into the container (11). Typically, a contact occurs between a tip (18) of the stretching rod (17) and a bottom (19) of the preform (2). When the stretching rod (17) is moved further into the preform (2), a longitudinal stretching of the preform (2) is brought about. After completion of the stretching process and at least temporarily also already during the performance of the stretching process, a filling material (21) removed from a storage device (20) is introduced under a filling pressure into the preform (2).

A metering of the filling material (21) occurs using a multi-path metering valve (22). In the represented embodiment example, the stretching rod (17) is formed as hollow or to have a channel at least in some sections. In the area of a wall of a tip-side end area of the stretching rod (17), outflow openings (24) are arranged, which can be closed off by a non-return valve (25) with respect to the multi-path metering valve (22). Thereby, unintentional dripping of filling material (21) out of the stretching rod (17) can be avoided or minimized.

A venting of the preform (2) can occur using a venting valve (26). The venting valve (26) is connected to an outflow opening (27) which is arranged in the area of a forming and filling head (28) applied to the preform (1). Through the forming and filling head (28), the stretching rod (17) can be positioned in axial direction. The preform (2) is sealed on its mouth-side end with respect to the forming and filling head (28) by a seal (29) which can be formed, for example, as an O-ring. An inner space (30) of the preform (2) can be connected via an annular gap (31) to the outflow opening (27). Here, the annular gap (31) surrounds the stretching rod (17) in some sections. The forming and filling head (28) can also be referred to as connection element in accordance with its function.

Figure 3:
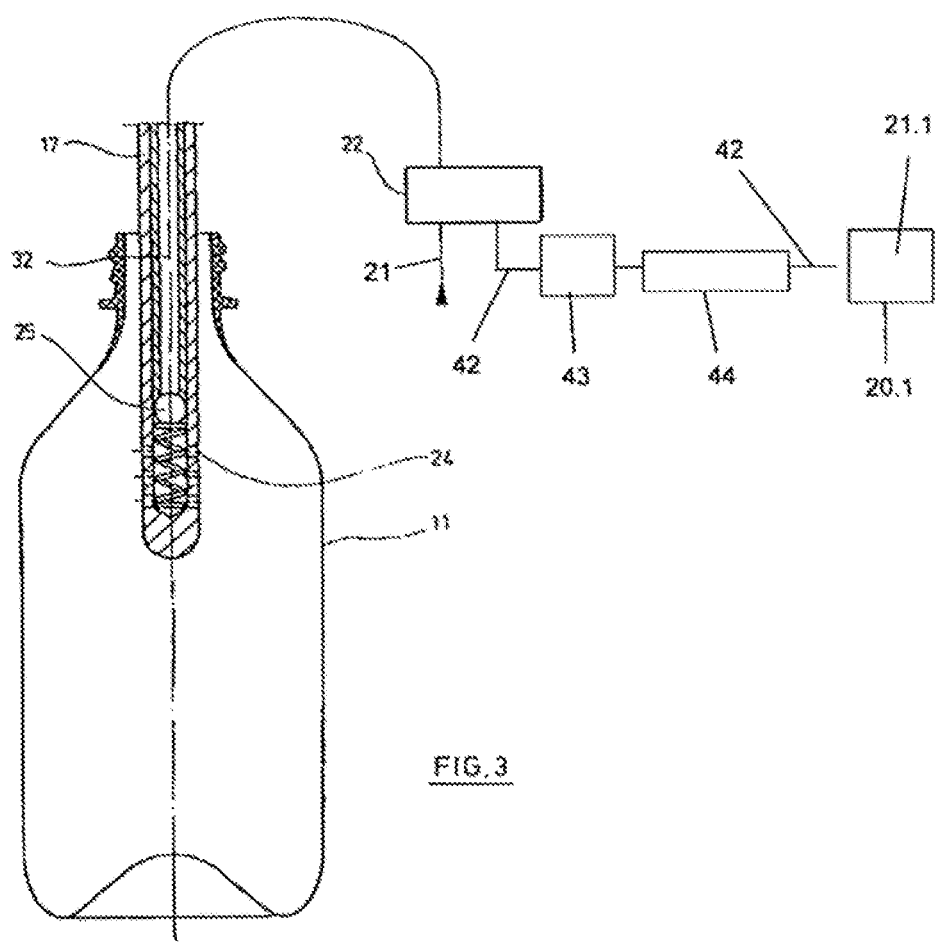

FIG. 3 diagrammatically shows a device similar to the representation according to FIG. 2 using a hollow stretching rod (17) with a built-in non-return valve (25). However, an already fully formed container (11) is represented. Both in FIG. 2 and in FIG. 3, one can see that preferably a plurality of outflow openings (24) are arranged in the tip-side end area of the stretching rod (17). In the embodiment example represented, such outflow openings (24) are positioned at different height levels along a longitudinal axis (32) of the stretching rod (17). The represented embodiment example also shows an orientation of the outflow openings (24) with a substantially horizontal outflow direction. However, both the arrangement of the outflow openings (24) in the tip-side end area of the stretching rod (17) and also the orientation of the outflow openings (24) are variable. Typically, the goal is an outflow behavior that is as calm and as free of spraying as possible.

According to an alternative embodiment, not represented, a solid stretching rod (17) can also be used. A supplying of the filling material (21) then occurs along at least one flow channel past the stretching rod (17). Preferably, for this purpose, the annular gap (31) is used. In this embodiment as well, it is possible to carry out a targeted venting.

Figure 4:
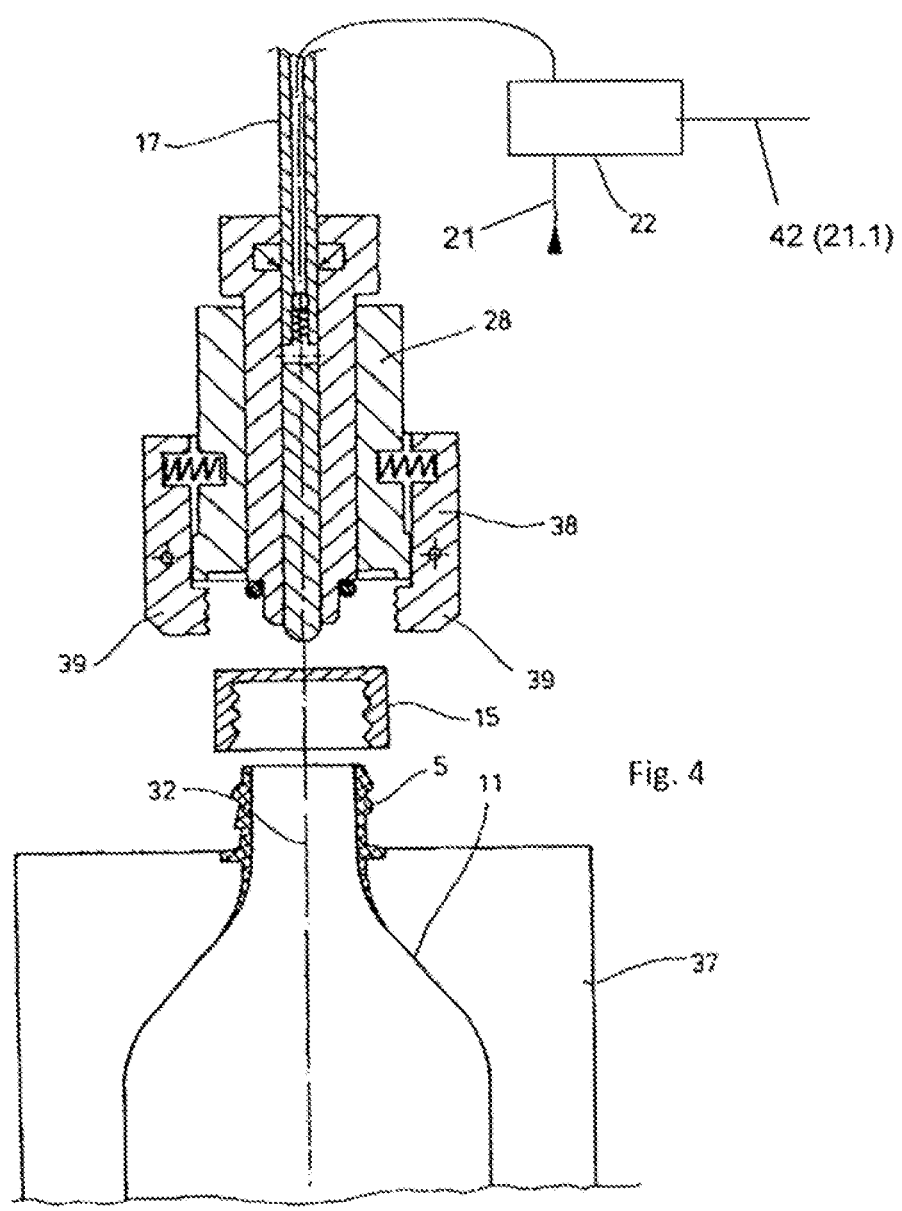

FIG. 4 shows an embodiment in which, in the area of the work wheel (9) according to FIG. 1, a closing of the containers (11) occurs. Here, the container (11) is still arranged in the area of a mold (37) which forms a part of the forming and filling station (10) according to FIG. 1. In this embodiment according to the prior art, a closing device (38) is arranged with respect to the longitudinal axis (32) coaxially to the forming and filling head (28). The closing device (38) has, for example, pivotally arranged grippers (39) which are provided for application of the closure cap (15). In particular, it is conceivable to arrange the closing device (38) so that it is rotatably movable relative to the forming and filling head (28). Thereby, the closure cap (15) can be screwed by means of an inner thread onto an outer thread of the mouth section (5).

Figure 5:
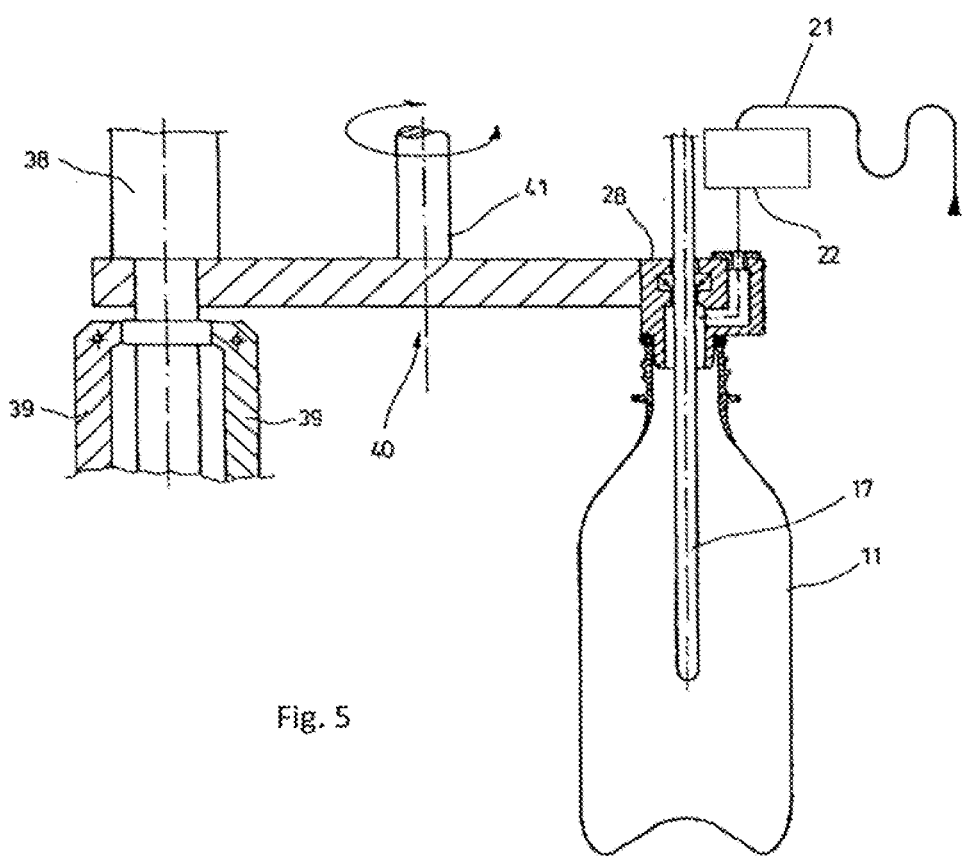

FIG. 5 shows an alternative embodiment, known from the prior art, to the construction according to FIG. 4. The closing device (38) and the forming and filling head (28) are here not arranged coaxially relative to one another but instead they are positioned by a tool carrier (40) alternately in a work arrangement and a rest arrangement. The tool carrier (40) can be designed, for example, like a tool revolver and be provided with a rotation shaft (41).

In the known embodiments of FIGS. 4 and 5, in the forming and filling head (28), in each case in addition to the channel or inner space (23) of the stretching rod (17), a fluid channel, not represented in these figures, is provided, and preferably a return gas channel is also provided. Below, several process-typical parameters are explained in greater detail as examples. The filling material (21) is supplied to the forming and filling head (28) preferably at a temperature of the surrounding space, for example, in the range from 20° C. to 30° C. The filling material (21) thereby cools the wall material of the container (11) and promotes the rapid reaching of dimensional stability of the formed container (11). Thereby, a very short cycle time is promoted. However, it is also possible to supply the filling material (21) in a more cooled or heated state.

During the forming of the container (11), the filling material (21) can be introduced at least temporarily be introduced with a constant volume stream into the preform (2) or the container (11). However, it is also possible to predetermine a suitable temporal profile for the volume stream, in such a way that at different times, volume streams of different magnitude are generated.

Before an introduction of the filling material (21), it is possible to suction air located within the preform (1) and/or to replace it with an inert gas. This is particularly advisable in the case of oxidation-sensitive filling media (21).

As filling material (21), either pure fluids or fluids provided with additives can be used. In particular, a supplying of carbonated filling media is conceivable. Since the filling material (21) is supplied to the preform (2) or to the container (11) under pressure, for example, under a pressure of 10 bar, it turns out to be advantageous to design all the flow paths for the filling material (21) in such a way that local decompressions due to flow processes can be avoided. A local or temporary decompression could otherwise lead to undesired outgassing of carbon dioxide.

Alternatively to the heating, represented in FIG. 1, of preferably injection molded preforms (2), it is also possible to produce the preforms (2) only immediately before their transformation into the containers (11). This can occur, for example, by an injection molding process such as in a so-called single-step injection blowing method. Compression molding is also possible. Such a forming of the preforms (2) avoids the use of electrical and electronic components in the area of a heating device or at least it substantially reduces the extent of use of such parts, since such parts are then only necessary for a possibly required temperature profiling.

Corrosion-resistant substances are preferably used as materials for the components of the work wheel (9). In particular, the use of stainless steels and plastics is conceivable. In particular, it is conceivable to form the molds (37) entirely or partially from a suitable plastic.

In order to minimize the required stretching forces, it is conceivable to assist the stretching process by a supply of the filling material (21). However, in the case of such an assistance, it is preferable to ensure that the guiding of the preform (2) by the stretching rod (17) is ensured. This can occur, for example, in that the acting stretching force is measured and a control of the volume stream of the filling material (21) occurs in such a way that a minimum stretching force is always maintained. The magnitude of the stretching force can be determined in particular very simply in the case of electrically driven stretching systems by measuring the drive current or in the case of pneumatic stretching systems by a pressure measurement.

In the filling of the containers (11) with the filling material (21), after closing the container (11), it is often desirable to provide a gas-filled head space. This free head space can be generated by the volume reduction resulting from the retraction of the stretching rod (17).

The material selection which has already been explained above occurs in particular also taking into consideration given hygienic requirements. Here, sanitization or sterilizability capability is ensured. In addition, a construction design is used so that the requirements for a good cleanability are met.

One or more of the transfer wheels can be equipped with servo drives. This promotes complete separation of the heating device (4) from the work wheel (9) during the performance of cleaning processes. Also, it is conceivable to arrange retractable handling elements in the area of at least one of the transfer wheels. An additional protection from moisture can occur by using a dry air tunnel.

Below, as an example, a concrete process sequence known from the prior art is described.

Before or after the insertion of the preform (2) into the mold (37), a gas exchange in the interior of the preform occurs preferably occurs, in order to displace oxygen or to reduce the proportion of oxygen. A flushing and/or evacuation process typically lasts at most 0.1 second. The stretching of the preform (2) using the stretching rod (17) typically lasts approximately 0.2 seconds. In addition, the time period of approximately 0.2 seconds is provided for the filling and the resulting transformation of the preform (2) into the container (11). For the subsequent creation of a head space, typically at most 0.2 seconds are needed. The process of settling and reduction of relaxing of the filled container occurs extremely rapidly if the beverages are flat; in the case of carbonated beverages, this process can take up to 5 seconds.

Subsequently, the treatment of the head space can occur using a high-pressure foaming and/or addition of nitrogen, for example. In the case of carbonated beverages, the subsequent supplying of a closure cap can take up to 1.5 seconds. In the same way, the process of closure or screwing on takes 1.5 seconds, for example.

After the completion of the closure of the container (1), the mold (37) opens and the filled container (11) is removed and transported away.

During the introduction of the filling material into the preform (2) to be transformed or into the container (11) which is still in the process of being formed, a typical pressure course results as a rule in the filling system or in the preform (2) or in the container (11) which is still in the process of forming. Due to the broadening of the container (11), the existing pressure is at first relatively low, and then it increases toward the end of the forming process. The corresponding pressure increase or the amount of pressure increase in the filling system, in particular in the filling line, can be used as a control variable for subsequent process steps and optionally determine the time of the introduction of this next process step. Alternatively or additionally, it is also conceivable to use, as control variables, the characteristic of the pressure course and/or of the volume stream of the filling material.

With regard to the temperature of the filling material, it is conceivable in particular to supply the filling material at an ambient temperature. Depending on the respective application constraints, a targeted temperature increase or a targeted temperature reduction of the supplied filling material is also conceivable.

According to an additional variant, it is conceivable to carry out the filling process in two steps, wherein, during the first process step, the filling material is supplied at a temperature which is greater than the temperature during the second process step. The first process step can be carried out, for example, when the longitudinal stretching of the preform (2) is carried out via the stretching rod (11). The second process step then follows the performance of the stretching process and corresponds to the radial broadening of the container (11).

During the settling in the head space after the pressure release, which was already mentioned briefly above, it is also conceivable to optionally carry out a suctioning of forming gases and/or foam.

Above, it has been assumed that, during the forming and filling, the respective preform (2) lies, with its open side pointing upward in sealing position, against the seal (29). However, embodiments of the forming and filling station (10) are also possible in which, during the forming and filling, the respective preform (2) lies, with its open side pointing downward in sealing position, against the seal (29) or against a corresponding seal of the forming and filling head (28).

The above description has been used to put the invention in a general technical context and to describe devices and methods, which are known in principle, for forming containers using the filling material as pressure medium. To that extent, the technical features described above in reference to FIGS. 1 to 5 should be understood to be preferred features which are, however, not intended to limit the claimed invention. Below, inventive developments of this prior art are described in reference to embodiment examples.

Figure 6:
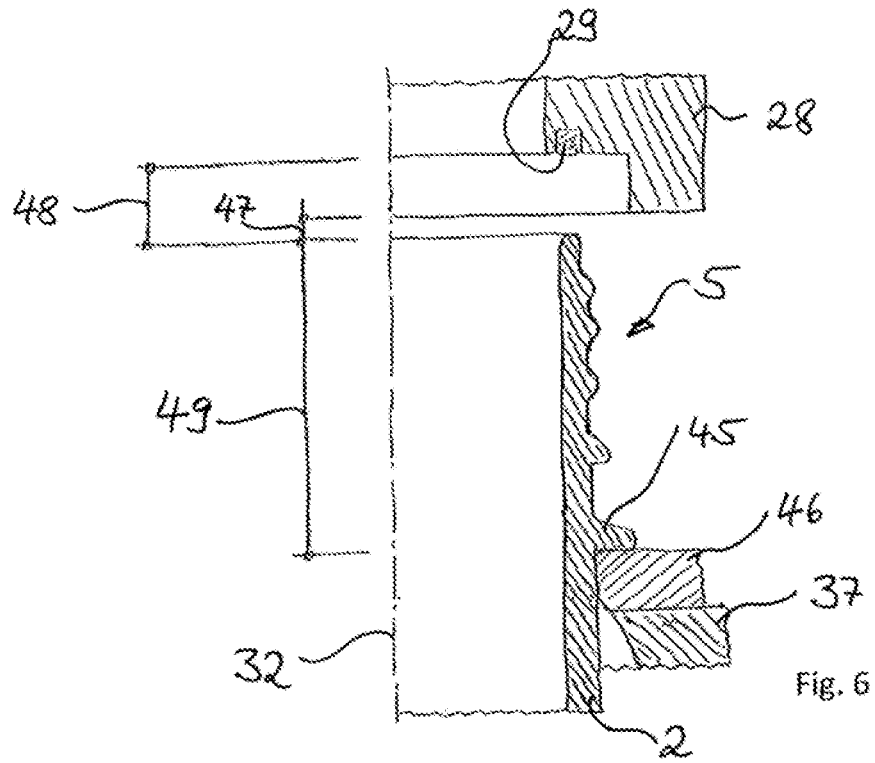

FIG. 6 shows in a detailed cross-sectional view a detail of a forming and filling station (10) with a forming and filling head (28). In the represented stage, the preform (2) is already in the closed mold (37). The so-called neck ring (45) of the preform (2) lies on the abutment plate (46) of the mold (37). This abutment plate (46) is screwed, for example detachably, to the mold (37), in order to provide for easy adaptability in the case of a change of the type of preform (2) for forming different containers. In the case of such a change in preform, the abutment plate (46) then merely needs to be exchanged for an abutment plate adapted to the changed preform type in each forming and filling station (10).

In the process phase shown, the forming and filling head (28) is in a rest position. Between the forming and filling head (28) and the upper mouth edge (51) of the mouth section (5) of the preform (2), an input slot (47) remains, which enables an opening and closing of the mold (37) and an insertion of a preform (2) in the opened mold (37). The difference in height between the seal (29) and the upper edge (51) of the mouth section (5) of the preform (2) defines a distance which can be referred to as sealing stroke length (48). The forming and filling head (28) has to be lowered onto the preform (2) by the value of this distance in order to achieve a sealing for the purpose of the filling of the filling material under pressure.

The arrangement of a sealing ring (29) on the forming and filling head (28), which is shown in FIG. 6, is considered to be preferable. In another conceivable arrangement provides for a sealing with respect to the preform (2) on a different preform section or for a sealing with respect to the abutment plate (46). Such an alternative arrangement is therefore considered to be less advantageous, since it would result in a greater sealing stroke length (48), and since the forming and filling head (28) would have to travel a greater distance between its sealing position and its rest position represented in FIG. 6.

Figure 7:
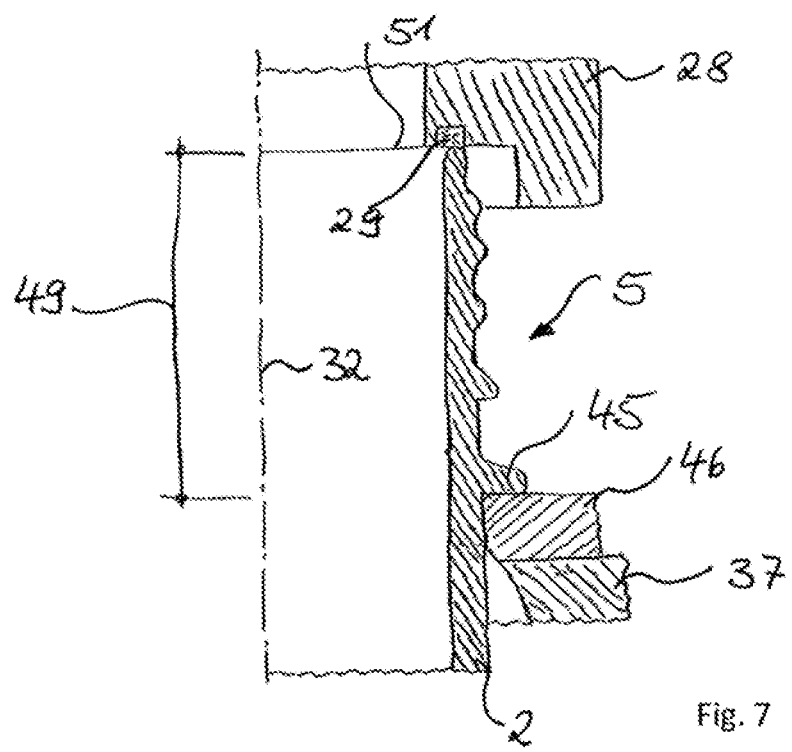
FIGS. 7-11 show additional diagrammatic representations in cross section analogous to the representation in FIG. 6 for additional process phases of an inventive forming and filling as well as closing process.

In the process phase represented in FIG. 7, the forming and filling head (28) is moved from the rest position of FIG. 6 into its sealing position. The sealing ring (29) then lies in a sealing manner on the mouth edge (51) of the preform (2). In this sealing state, filling material under pressure can then flow into the preform (2) and the forming process can be carried out. In a manner not represented, a stretching rod (17) can be shifted in axial direction through the forming and filling head (28), when the forming process is to be assisted by a stretching rod (17). Here, reference can be made to the explanations of FIGS. 2-5 with regard to the stretching rod (17).

Figure 8:
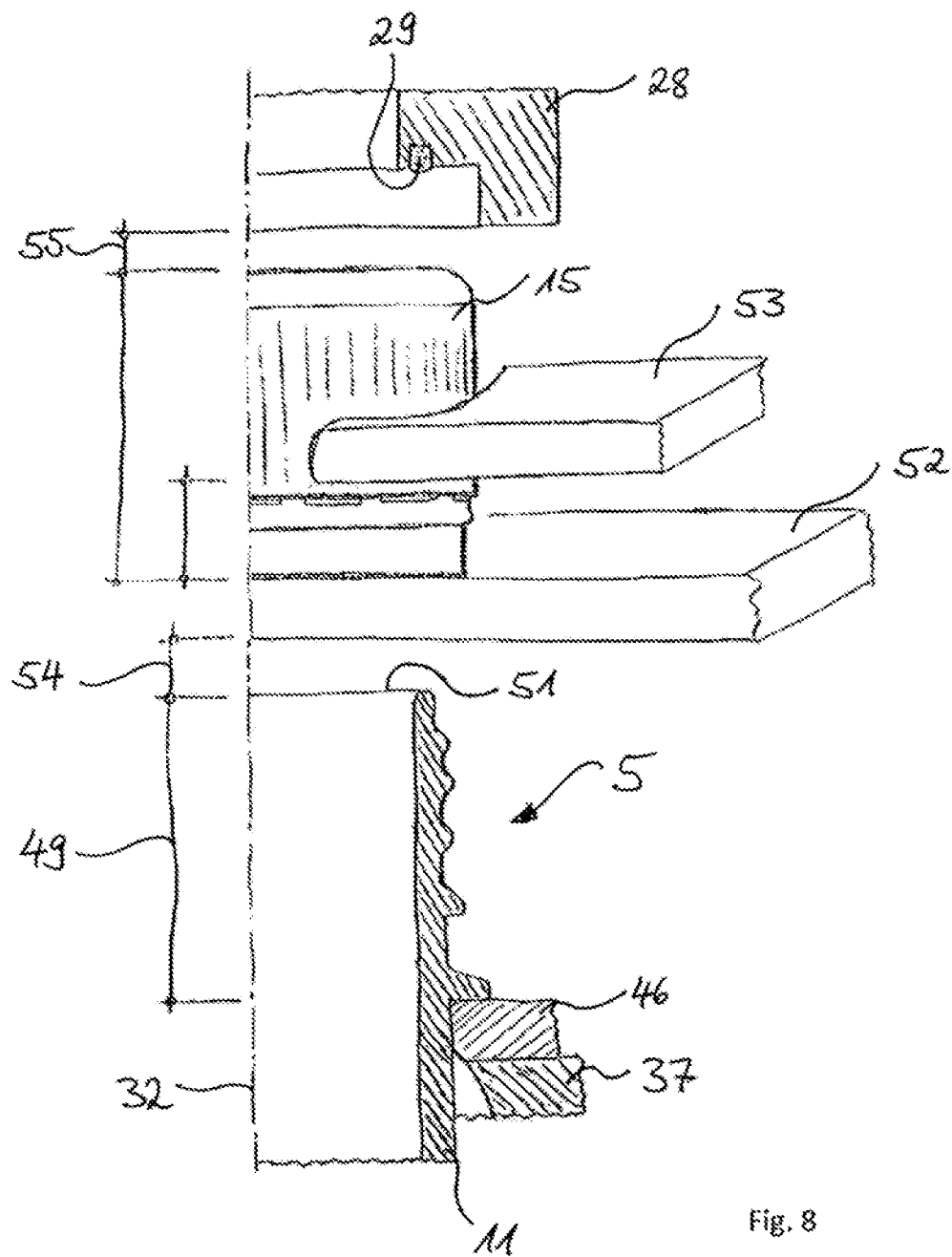

In the process phase represented in FIG. 8, the forming and filling process is completed, i.e., the preform (2) has now become a container (11), and the forming and filling head (28) has been removed from the sealing position by a movement into a position which enables a supplying of a closure cap (15). In the represented embodiment example, this cap supplying position of the forming and filling head (28) is selected so that a cap supplying device (50) designed as supply rail (52) can be moved in between the container mouth (51) and the forming and filling head (28). Moreover, the positioning is selected so that a closure cap (15) can be introduced in between the container mouth (51) and the forming and filling head (28). In the represented example, the supplying of the cap (15) occurs on the guide rail (52) represented, on which a closure cap (15) is arranged by means of a loading finger (53) in a target position above the container mouth (51). A loading slot (54) remains between the guide rail (52) and the mouth section (5) of the container (11), and an entry slot (55) also remains between the upper side of the closure cap (15) and the forming and filling head (28), so that the closure cap can be shifted into its target position without colliding with the forming and filling head (28). To avoid long distances, the mentioned slots (54, 55) are dimensioned so that, on the one hand, there is no risk of collision during the movement of the cap (15) and during the movement of the guide rail (52), while, however, on the other hand, the stroke distances to be bridged are as small as possible.

Figure 9:
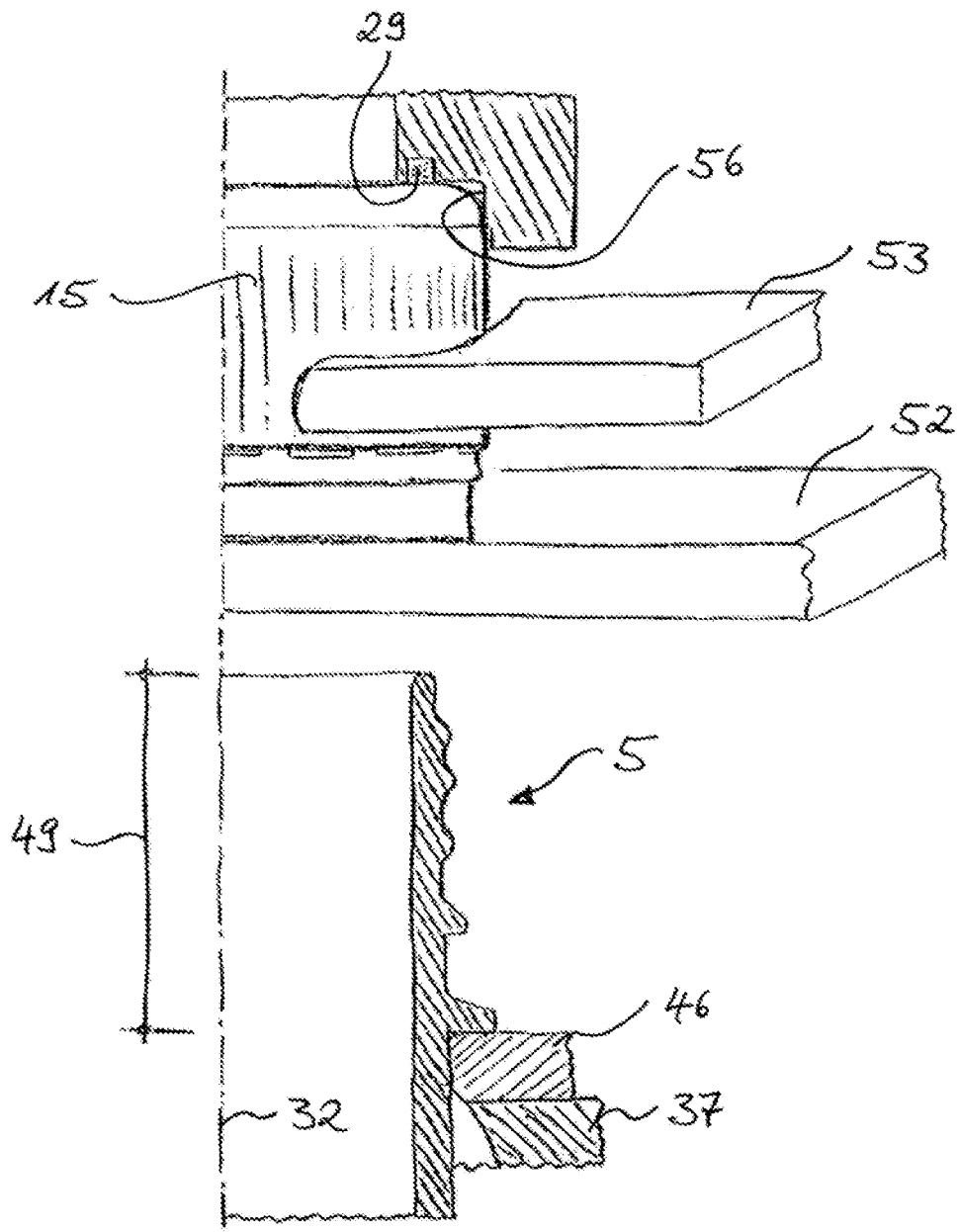

After a completion of the supplying of a closure cap (15), represented in FIG. 8, the forming and filling head (28) is lowered as represented in FIG. 9. On the cap side, the forming and filling head (28) has a recess (56) which is adapted in terms of its dimensions to the closure cap (15), in such a way that the closure cap (15), with the lowering of the forming and filling head (28), is received in this recess (56) in such a manner that it is protected against tipping. In the embodiment represented, the closure cap (15) is held without play and in a clamping manner. However, a certain degree of play and thus a certain degree of tipping can also be provided. The seal (29) is arranged in the area of the recess (56). During the lowering of the forming and filling head (28), for example, for the reception of the closure cap (15) in a clamping manner, the guide rail (52) and preferably also the loading finger (53) remain in their supply position of FIG. 8, for downward support of the closure cap (15), so that the cap (15) can be pressed into the recess (56). It is only thereafter that the guide rail (52) and optionally the loading finger (53) are moved. The closure cap (15) is now held by the forming and filling head (28). However, the lowering of the forming and filling head (28) and the movement of the guide rail (52) and/or of the loading finger (53) can also occur simultaneously.

Figure 10:
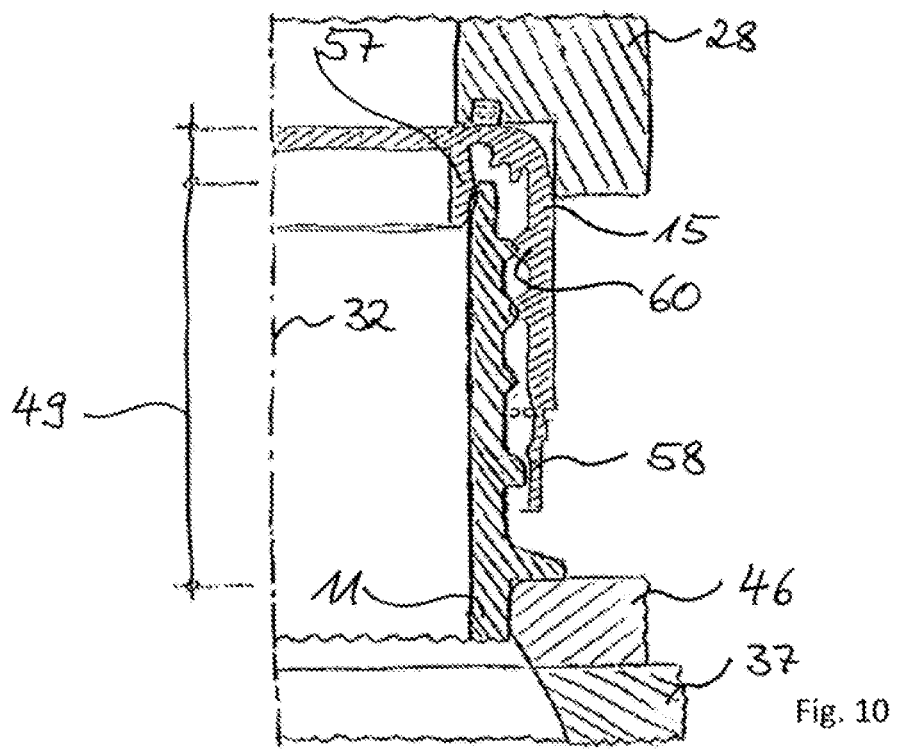
Figure 11:
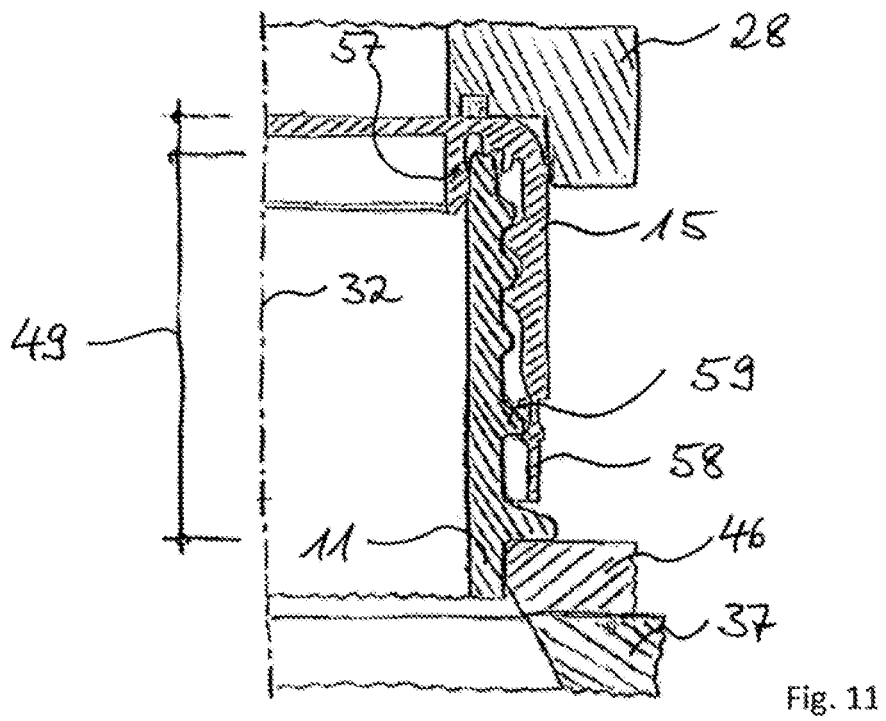

In the process phase represented in FIG. 10, the forming and filling head (28) has been lowered together with the closure cap (15) held thereby in the direction of the filled container (11). The forming and filling head (28) presses the closure cap (15) over a certain distance of the mouth height (49) onto the mouth area (5) of the container (11), until a desired closure position is reached. FIG. 11 shows this desired closure position of the forming and filling head (28), in which a sealing ring (57) formed on the inner side of the closure cap (15) comes in contact with a mouth area (5) of the container (11). The closure position of the forming and filling head (28) can also be selected so that the closure cap (15) is at first shifted only so far onto the mouth area (5) of the container (11) that a preliminary sealing with respect to liquid outflow is achieved, and it is only at a later time, for example, outside of the forming and filling station (10), that an additional closure unit can definitively place the closure cap (15) onto the filled container (11), for example, screw it into its final closure position. In the embodiment example represented in FIG. 11, on the other hand, the closure position of the forming and filling head (28) is selected so that the closure cap (15) has reached its final closure position, i.e., a guarantee ring (58) formed on the closure cap (15), for example, is engaged on the securing ring (59) of the container (11), and the thread (60) formed on the inner side of the closure cap is also in the desired engagement with the container thread (61) formed on the outer side on the mouth area (5) of the container (11). In this case, a subsequent further engagement of a closure device outside of the forming and filling station (10) would not be necessary, since the cap (15) has already reached its final sealing position due to the pressing down by the forming and filling head (28).

After the completion of the pressing of the closure cap (15) onto the container (11), the forming and filling head (28) can be moved again into a removal position which enables a removal of the container (11) which has been fully formed, filled and provided with a closure cap (15). This removal position of the forming and filling head (28) can correspond to the rest position in FIG. 6 if this position sufficiently takes into consideration that it is no longer an unclosed container (11) that has to be removed, but is rather a container (11) provided with a closure cap (15).

Figure 12:
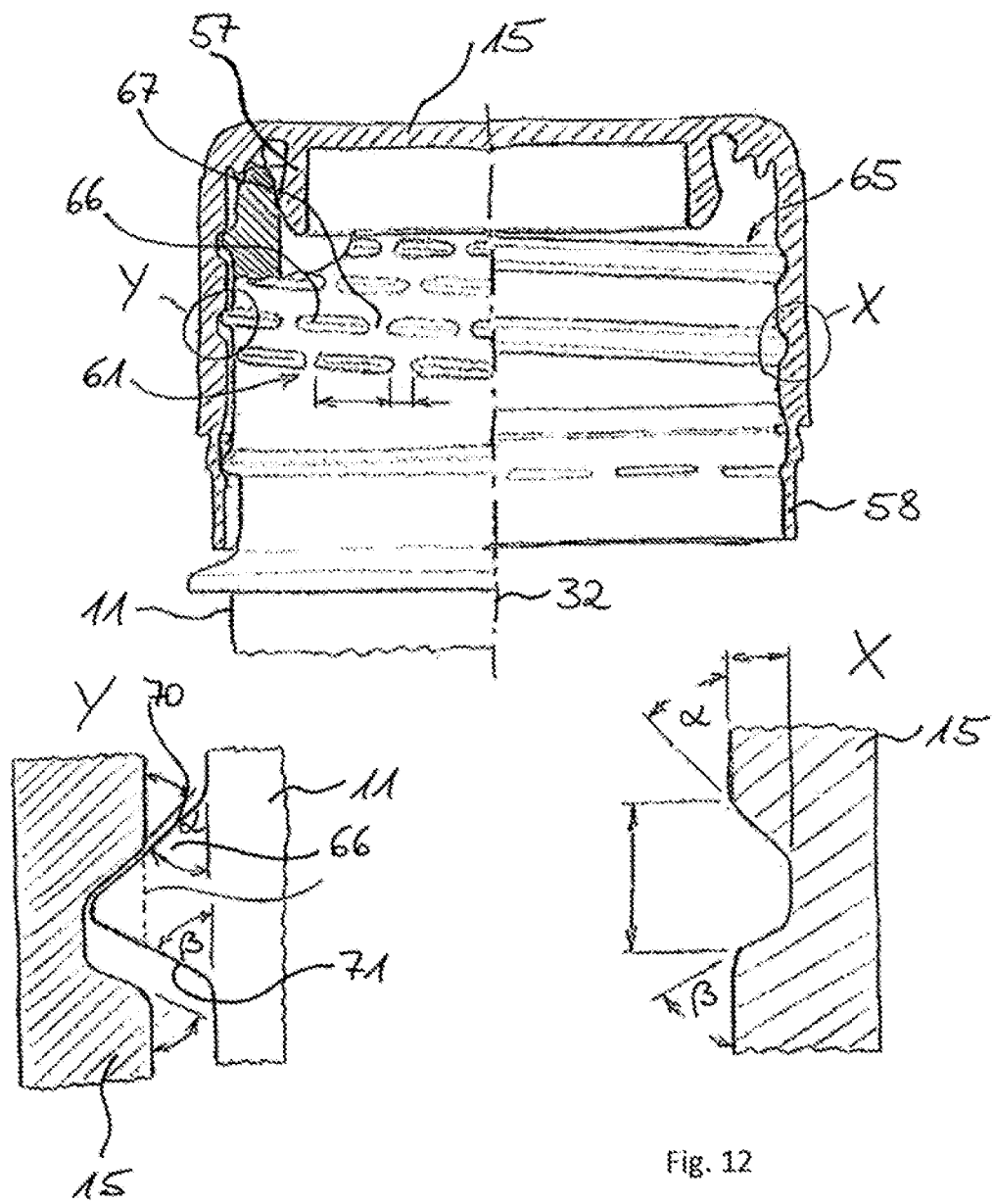
FIGS. 12-16 show embodiment variants for advantageously formed closure caps and mouth sections of preforms for carrying out the inventive forming and filling as well as closing processes.

FIGS. 12-16 show closure caps (15) and mouth areas (5) of containers (11) or of preforms (2), which advantageously assist in the above-described pressing of a closure cap (15) onto a container (11). Thus, for example, FIG. 12 shows a rotation closure cap (15) which is advantageous for the shifting of the closure cap (15) onto the mouth area (5) of a container (11) and which has thread grooves (65) on the inner side. These thread grooves (65) work together with an outer thread (61) on the container (11), wherein this other thread (61) consists of thread lamellas (66), that is to say thread segments, between which interruptions (67) are formed. Due to this formation of the threading (61) in the form of thread segments with interruptions lying in between, the pressing of the closure cap (15) onto the container (11) by the forming and filling head 28) is facilitated. This pressing on is also additionally simplified in that the mouth opening-side flank (70) of a thread segment (66) has a different inclination angle with respect to the container longitudinal axis (32) from the container bottom-side flank (71) of the thread lamella (66). In particular, advantageously the inclination angle (β) of the bottom-side flank (71) is greater than the inclination angle (α) of the container opening-side flank (70). The flanks of the thread grooves (65), which are complementary thereto, are designed analogously on the inner side of the closure cap (15) in terms of their inclination angle.

Figure 13:
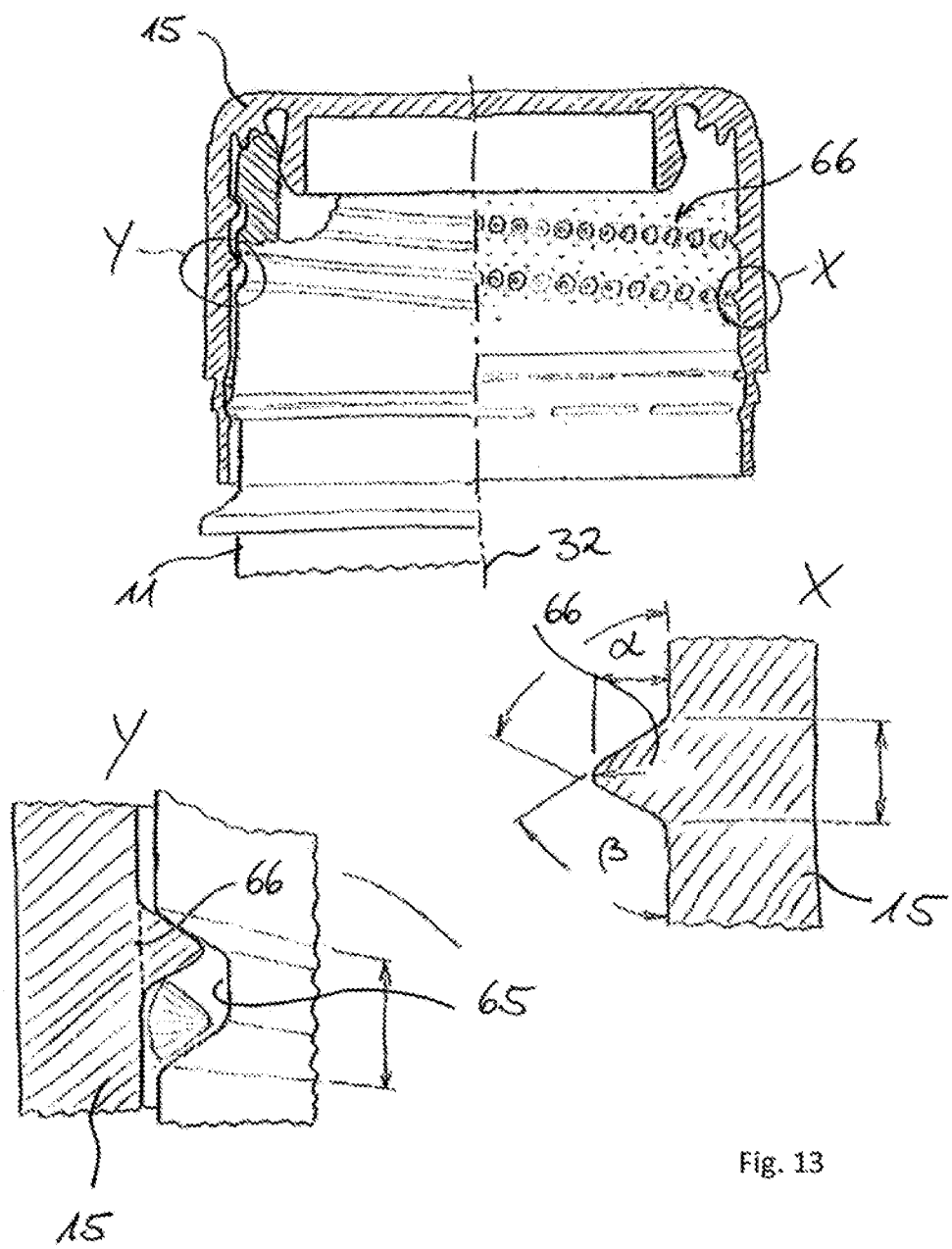

FIG. 13 shows in a way a reversal of the principle represented in FIG. 12. The thread groove (65) is now implemented on the outer side on the container (11), while, on the inner side in the closure cap (15), thread segments (66) with interruptions lying in between (67) are implemented. These thread segments (66), in the embodiment example of FIG. 13, have a knob-like shape, which could also be implemented in the embodiment example of FIG. 12.

Figure 14:
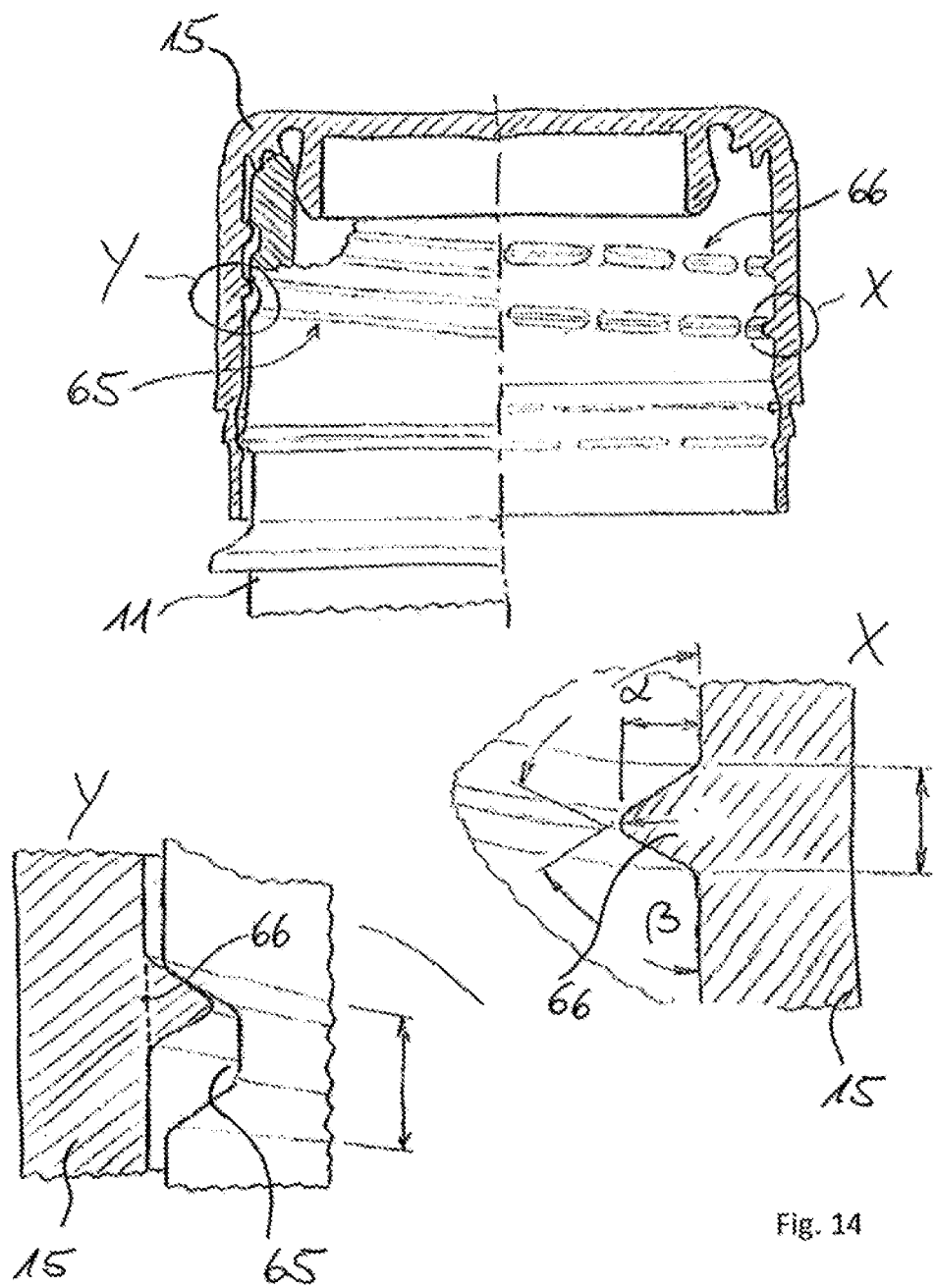

The embodiment example of FIG. 14 corresponds substantially to the embodiment example of FIG. 13, wherein the knob-like thread segments (66) on the cap inner side are replaced by thread lamellas.

Figure 15:
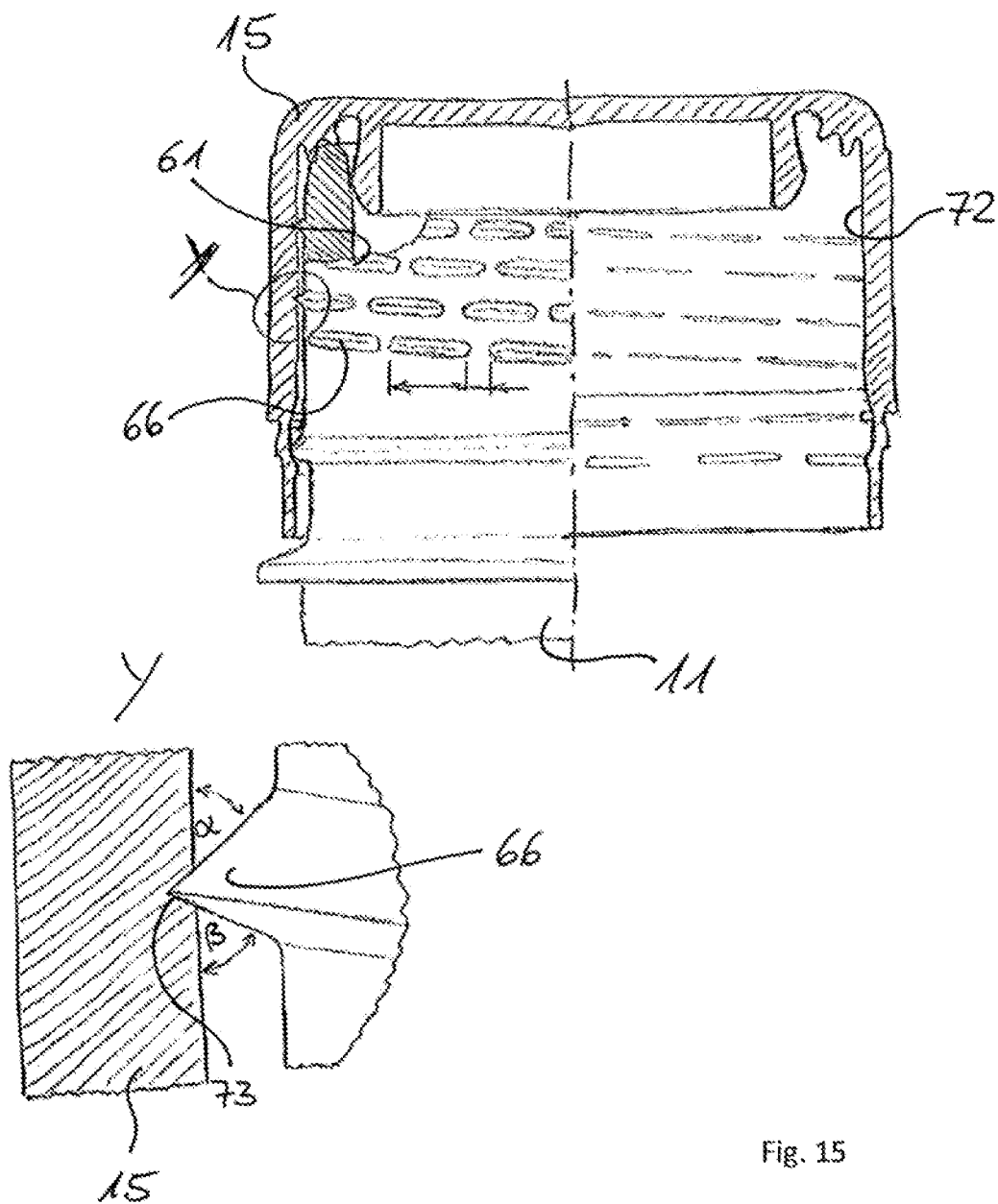

In the embodiment example of FIG. 15, there is a closure cap (15) which has a smooth inner surface (72) on the inner side, i.e., on its cap side turned toward the container (11). The container (11) has an outer thread (61) with sharp-edge thread cams (73) which, for example, are again implemented as thread lamellas (66). Here too, the thread flank angles (α) and (β) are selected to be different, in order to promote a pressing of the closure cap (15) onto the container (11). Due to the pointed-edge design of the thread lamellas (66), the thread lamellas (66) of the container are pressed into the smooth inner side (72) of the cap (15) and, when the closure cap (15) is twisted off the container (11), the thread lamellas (66) gouge a thread into the cap (15).

Figure 16:
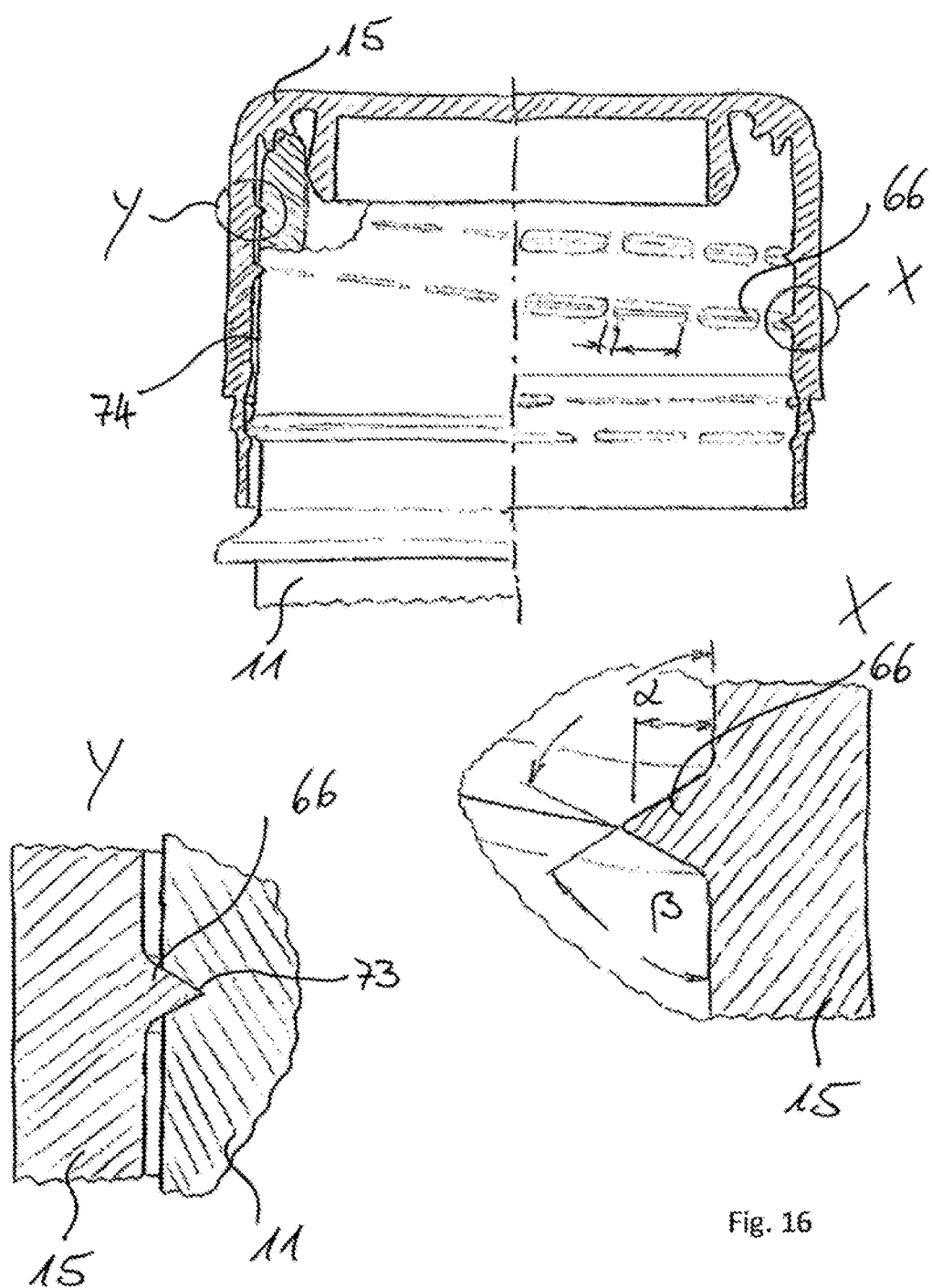

FIG. 16 shows a reversal of this principle. In this embodiment example, the outer side (74) of the container (11) is then formed to have a smooth surface in its mouth section (5), while sharp-edged thread lamellas (66) are implemented on the inner side on the side of the closure caps (15) turned toward the container (11). Here too, after the pressing onto the mouth area (5) of the container (11), these sharp-edged thread lamellas (66) are pressed into the previously smooth outer surface (74) of the container mouth (5), and, during the unscrewing of the closure cap (15) for opening and generate thread grooves on the outside on the container (11).

Figure 17:
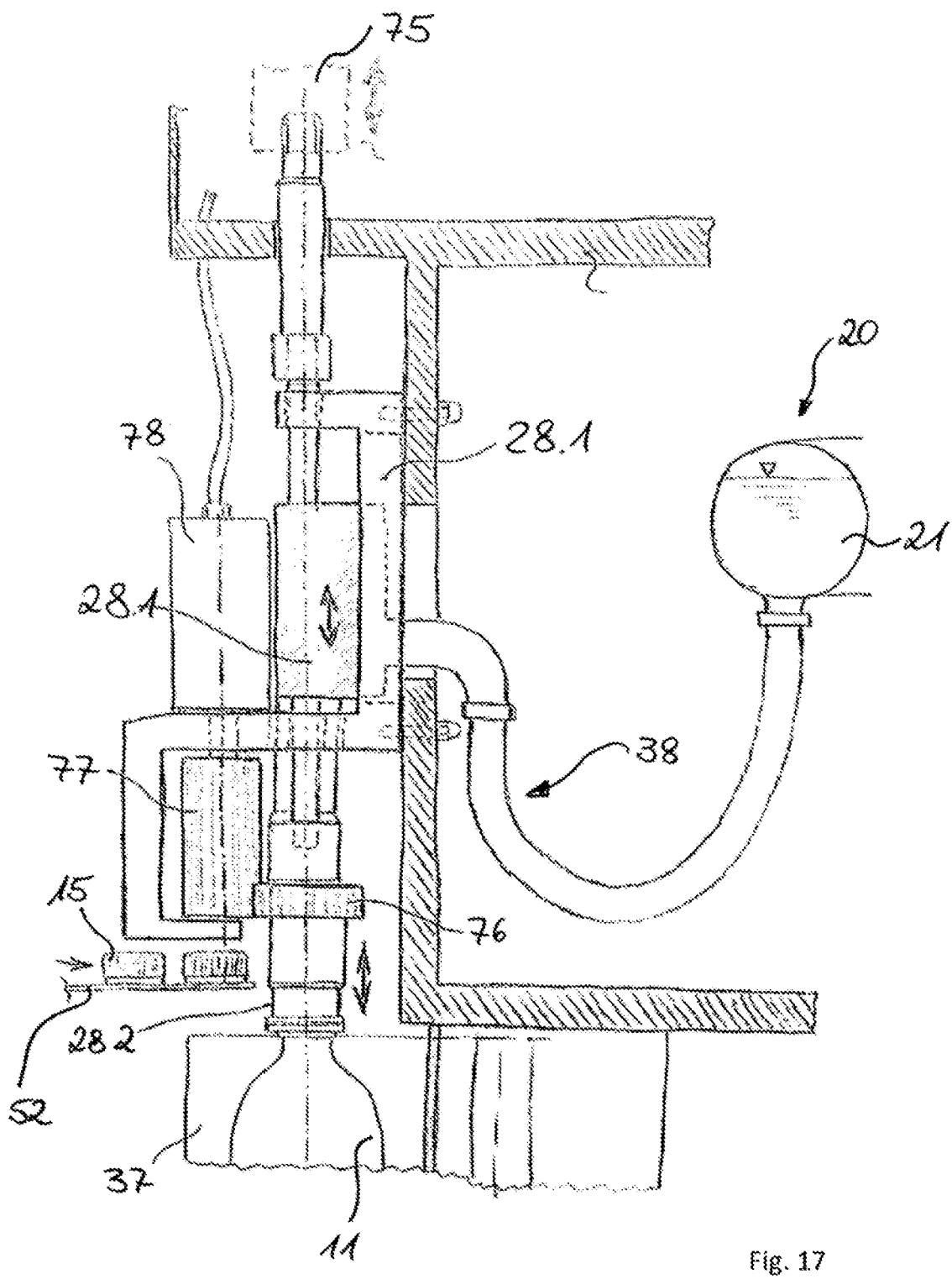
FIG. 17 shows a diagrammatic representation of a forming and filling machine for carrying out the hydraulic container forming using a filling material with an alternative embodiment example of a closure device.

FIG. 17 shows, in a diagrammatic representation, an inventive forming and filling machine for carrying out the hydraulic container forming using a filling material (21) with an additional embodiment example of a closure device (38). As already explained in reference to FIG. 1, filling material (21) under pressure is supplied by a storage device (20) to a forming and filling head (28). The forming and filling head (28) is provided with a drive device (75), in order to be able to carry out the necessary movements of the stroke, namely, for example, in order to be able to assume the positions explained in reference to FIGS. 6-11. The drive device (75) of the forming and filling head (28) is actuated accordingly, and, for example, this drive device (75) can be an electrical drive device, for example, a linear motor.

Represented in FIG. 17 is the forming and filling head (28) in its sealing position, the principle of which is also represented in FIG. 6, i.e., the forming and filling head (28) is in sealing contact on the container (11) which is received in a mold (37). The forming of the preform (2) into the container (11) has been completed, and the drive device (75) could then lift the forming and filling head (28) from the container (11) and move it into the position represented in FIG. 8, for example. After such a process, the supply rail (52) with closure caps (15) arranged thereon could then be shifted forward into the area between container mouth (5) and forming and filling head lower side (28), and the additional closure steps explained in reference to FIGS. 9-11 could be carried out.

According to the embodiment example of FIG. 17, on the outer side, the forming and filling head (28) has a toothed wheel (76) which is in meshing engagement with a driving toothed wheel (77). This driving toothed wheel (77) can be rotated, for example, driven by a motor, and as a result rotate the forming and filling head (28). Preferably, for this purpose, the forming and filling head (28) will be designed to be rotatable in a container-side section (28.2), while another section (28.1) of the forming and filling head (28) is designed to be torque-proof. The forming and filling head (28) would thus have to be subdivided into a rotatable section (28.2) and a torque-proof section (28.1), which are mounted rotatably next to one another.

The pressing of the closure cap (15) onto the container (11), which was explained in reference to FIGS. 6-11, could then be completed by a screw-on movement in the case of the embodiment of FIG. 17. As explained in reference to FIGS. 6-11, first a closure cap (15) could be pressed onto the container (11) by a lowering movement of the forming and filling head (28). When a certain pressed on position has been reached, the outer toothed wheel (77) could then be rotated driven by a motor and rotate the rotatable head area (28.2) carrying the toothed wheel (76), so that the closure cap (15) supported thereby is also rotated and as a result, for example towards the end of the closure process, is screwed onto the filled container (11), for example, until the final closure position represented in FIG. 11 has been reached. For example, it is conceivable that, in a first closure step, the cap (15) is pressed by the forming and filling head (28) onto the container (11) until a first thread engagement between cap (15) and outer thread (61) on the container (11) is achieved, and thereafter the outer toothed wheel (77) is driven to rotate. The drive (78) of the external toothed wheel (77) can be formed, for example, as a servomotor.

| List of reference numerals | |
|---|---|
| 1 | Supply device |
| 2 | Preform |
| 3 | Transfer wheel |
| 4 | Heating device |
| 5 | Mouth section |
| 6 | Heating element |
| 7 | Transport device |
| 8 | Transfer wheel |
| 9 | Work wheel |
| 10 | Forming and filling station |
| 11 | Container |
| 12 | Removal wheel |
| 13 | Output section |
| 14 | Input device |
| 15 | Closure cap |
| 16 | Partitioning device |
| 17 | Stretching rod |
| 17.1 | Narrowing |
| 18 | Tip of the stretching rod |
| 19 | Bottom of the preform |
| 20, 20.1 | Storage device |
| 21, 21.1 | Filling material |
| 22 | Metering valve |
| 23 | Inner space of the stretching rod |
| 24 | Outlet mouth |
| 25 | Non-return valve |
| 26 | Aeration valve |
| 27 | Outlet mouth |
| 28 | Forming and filling head |
| 29 | Seal |
| 30 | Inner space of the preform |
| 31 | Annular gap |
| 32 | Longitudinal axis of the bottle or stretching rod |
| 33 | Sealing element |
| 34 | Counter-element |
| 35 | Bearing |
| 36 | Supply mouth |
| 37 | Mold |
| 38 | Closing device |
| 39 | Gripper |
| 40 | Tool carrier |
| 41 | Rotation shaft |
| 42 | Line or line section |
| 43 | Carbonation unit |
| 44 | Cooling unit |

-continued

| List of reference numerals | |
|---|---|
| 45 | Neck ring |
| 46 | Abutment plate |
| 47 | Input slot |
| 48 | Sealing stroke length |
| 49 | Length of mouth section |
| 50 | Cap supplying device |
| 51 | Container mouth |
| 52 | Guide rail |
| 53 | Loading finger |
| 54, 55 | Slot |
| 56 | Recess |
| 57 | Sealing ring |
| 58 | Guarantee ring |
| 59 | Securing ring |
| 60 | Inner thread of cap |
| 61 | Outer thread of container/preform |
| 65 | Thread groove |
| 66 | Thread lamella |
| 67 | Interruption |
| 70, 71 | Flank of thread lamella |
| 72 | Inner surface |
| 73 | Thread ridge |
| 74 | Outer surface |
| 75 | Drive device |
| 76, 77 | Toothed wheel |
| 78 | Drive |

The invention claimed is:

1. A method for producing a container filled with a liquid filling material from a preform made of a thermoplastic material, the method comprising steps of:
thermally conditioning the preform; and
transforming the thermally conditioned preform, during a forming and filling phase, in a mold of a forming and filling station into the container by introducing the liquid filling material into the preform as a pressure medium;
wherein the filling material is introduced from a forming and filling head into the preform,
wherein the forming and filling head is moved from a rest position, which enables a supplying and insertion of a preform into the mold of the forming and filling station, into a sealing position with respect to the preform,
wherein, after the forming and filling phase, the container is closed with a closure cap before the container is removed from the forming and filling station,
wherein, after the forming and filling phase, the forming and filling head is moved from the sealing position into a position spaced apart from the container, then the closure cap is supplied from a cap supplying device into an area between container and forming and filling head, and then the closure cap is pressed by the forming and filling head in a longitudinal direction of the container onto the container to close the container at least temporarily, and
wherein a side of the forming and filling head facing the mold includes a receiving device for the closure cap, and wherein the receiving device receives the closure cap supplied by the cap supplying device by performing a receiving movement toward the closure cap, and wherein the received closure cap is then pressed onto the container.

2. The method according to claim 1, wherein during the transforming step, the preform is guided at least temporarily by a stretching rod and stretched in axial direction.

3. The method according to claim 1, wherein the receiving device is a recess formed in the forming and filling head, and wherein the recess is dimensioned to receive the closure cap in a manner that prevents the closure cap from tipping.

4. The method according to claim 1, wherein the cap supplying device has a positionable supply rail on which the closure cap is supplied in a sliding manner to the forming and filling station.

5. The method according to claim 4, wherein the cap supplying device further comprises a loading finger for moving the closure cap on the supply rail.

6. The method according to claim 1, wherein the closure cap is a threaded closure cap.

7. The method according to claim 6, wherein the forming and filling head comprises a rotatable head section which is rotatably arranged on a torque-proof head section and which comprises a drive device for rotating the rotatable head section with respect to the torque-proof head section, wherein the drive devices comprises two mutually meshing toothed wheels, wherein a first of said two mutually meshed toothed wheels is driven by a driving means, wherein a second of said two mutually meshed toothed wheels is firmly connected to the rotatable head section, and wherein the pressed-on closure cap is rotated by means of the rotatable head section with respect to the container to definitively close the container.

8. The method according to claim 1, wherein the forming and filling station is arranged on a rotating work wheel which revolves continuously in a container production operation.

9. A device for producing a container filled with a liquid filling material from a preform made of a thermoplastic material, the device comprising:
 a heating section for thermally conditioning the preform;
 at least one forming and filling station comprising a mold;
 at least one storage device for providing the liquid filling material;
 a forming and filling head for introducing the liquid filling material into the preform under pressure;
 a closing device for closing the container with a closure cap; and
 a cap supplying device for supplying the closure cap to the at least one forming and filling station;
 wherein the forming and filling head is configured to at least partially press the closure cap onto the container to at least temporarily close the container, and
 wherein a side of the forming and filling head facing the mold includes a receiving device for the closure cap, and wherein the forming and filling head is configured to perform a receiving movement toward the supplied closure cap for receiving the closure cap.

10. The device according to claim 9, further comprising a stretching rod for axially stretching and guiding the preform at least temporarily as the preform is transformed into the container.

11. The device according to claim 9, wherein the at least one forming and filling station is arranged on a rotating work wheel that is configured to continuously revolve in a container production operation.

12. The device according to claim 9, wherein the receiving device is a recess formed in the forming and filling head, which is dimensioned to receive the closure cap in a manner that prevents the closure cap from tipping.

13. The device according to claim 9, wherein the cap supplying device has a positionable supply rail on which the closure cap is supplied in a sliding manner to the forming and filling station.

14. The device according to claim 13, wherein the cap supplying device further comprises a loading finger for moving the closure cap on the supply rail.

15. The device according to claim 9, wherein the closure cap is a threaded closure cap.

16. The device according to claim 15, wherein the forming and filling head comprises a rotatable head section which is rotatably arranged on a torque-proof head section and which comprises a drive device for rotating the rotatable head section with respect to the torque-proof head section, wherein the drive device is comprises two mutually meshing toothed wheels, wherein a first of said two mutually meshed toothed wheels is driven by a driving means, and wherein a second of said two mutually meshed toothed wheels is firmly connected to the rotatable head section.

* * * * *